United States Patent
Hasegawa

(10) Patent No.: US 7,460,838 B2
(45) Date of Patent: Dec. 2, 2008

(54) CONTROL STATION, A WIRELESS COMMUNICATION SYSTEM AND A WIRELESS COMMUNICATION METHOD

(75) Inventor: Naoki Hasegawa, Tokyo (JP)

(73) Assignee: NEC Corporation (JP)

( * ) Notice: Subject to any disclaimer, the term of this patent is extended or adjusted under 35 U.S.C. 154(b) by 881 days.

(21) Appl. No.: 10/921,472

(22) Filed: Aug. 19, 2004

(65) Prior Publication Data

US 2005/0164727 A1 Jul. 28, 2005

(30) Foreign Application Priority Data

Jan. 28, 2004 (JP) ............................ 2004-019542

(51) Int. Cl.
*H04B 1/38* (2006.01)
(52) U.S. Cl. ............... 455/90.2; 455/412.1; 455/414.1; 370/352; 370/389; 370/338; 370/328
(58) Field of Classification Search .............. 455/90.2, 455/412.1, 414.1; 370/352, 389, 338, 328
See application file for complete search history.

(56) References Cited

U.S. PATENT DOCUMENTS

| | | | | |
|---|---|---|---|---|
| 5,530,914 | A * | 6/1996 | McPheters | 455/518 |
| 6,763,226 | B1 * | 7/2004 | McZeal, Jr. | 455/90.2 |
| 6,792,281 | B2 * | 9/2004 | Upp et al. | 455/519 |
| 6,804,529 | B1 * | 10/2004 | Barnes et al. | 455/515 |
| 7,035,658 | B2 * | 4/2006 | Drozt et al. | 455/519 |
| 7,089,027 | B1 * | 8/2006 | Welch et al. | 455/521 |
| 7,231,223 | B2 * | 6/2007 | May et al. | 455/519 |

(Continued)

FOREIGN PATENT DOCUMENTS

JP 11-55741 2/1999

(Continued)

OTHER PUBLICATIONS

"IDEN Technical Overview" Aug. 8, 2000; <URL: http://idenphones.motorola.com/iden/developer/developer_technical_info.jsp> Download the Complete iDEN System Overview pdf (2.7 MB); (Chap. 4: Dispatch Call Processing, 4-3: Dispatch Location Area, Figure 4-3 Simplified Dispatch Program).

(Continued)

*Primary Examiner*—Matthew Anderson
*Assistant Examiner*—Dominic E Rego
(74) *Attorney, Agent, or Firm*—Ostrolenk, Faber, Gerb & Soffen, LLP

(57) ABSTRACT

A radio communication system by which an additional terminal can be easily registered to group information to set up radio communication between particular terminals, and a new user can conduct radio communication in a short period of time. When a group application request to establish radio communication between POC terminals is received, a CUG server creates a group table, generates group information by assigning group identification information to the group table, and stores the group information in the server. The CUG server then delivers the group identification information to a host POC terminal. When a registration request to the group table and group identification information are received from a POC terminal, the CUG server retrieves a group table assigned with the group identification information received from the POC terminal to automatically register terminal identification information of the POC terminal as the registration request source to the group table.

102 Claims, 11 Drawing Sheets

U.S. PATENT DOCUMENTS

| | | | |
|---|---|---|---|
| 2003/0049401 A1* | 3/2003 | Duke et al. | 428/36.91 |
| 2003/0100326 A1* | 5/2003 | Grube et al. | 455/515 |
| 2003/0216146 A1* | 11/2003 | Otsuka | 455/462 |
| 2004/0018834 A1* | 1/2004 | Talaie et al. | 455/422.1 |
| 2004/0192364 A1* | 9/2004 | Ranalli et al. | 455/517 |
| 2004/0203793 A1* | 10/2004 | Dorenbosch | 455/445 |
| 2004/0203907 A1* | 10/2004 | Hiller et al. | 455/456.1 |
| 2004/0249949 A1* | 12/2004 | Gourraud et al. | 709/227 |
| 2005/0143135 A1* | 6/2005 | Brems et al. | 455/564 |
| 2005/0201311 A1* | 9/2005 | Willey et al. | 370/311 |
| 2005/0221819 A1* | 10/2005 | Patel et al. | 455/432.1 |

FOREIGN PATENT DOCUMENTS

| | | |
|---|---|---|
| JP | 2000-244508 | 9/2000 |
| JP | 2003-298751 | 10/2003 |
| JP | 2005-524254 | 8/2005 |
| WO | WO 03/069943 | 8/2003 |
| WO | WO03/083691 | 10/2003 |

OTHER PUBLICATIONS

Untranslated Japanese Office Action dated Nov. 2, 2006 issued in connection with corresponding Japanese patent application No. 2004-019542.

European Application publication No. WO2003/083691 submitted as translation of corresponding Japanese patent No. 2005-524254.

International Search Report (w/o citations) dated Aug. 7, 2003 issued in connection with cited Japanese patent application 2005-524254.

* cited by examiner

F I G. 2
(PRIOR ART)

| |
|---|
| • GROUP IDENTIFICATION INFORMATION  :  * * * * |
| • FIRST PTT TERMINAL IDENTIFICATION INFORMATION  :  A A A A A A |
| • SECOND PTT TERMINAL IDENTIFICATION INFORMATION  :  B B B B B B |
| • THIRD PTT TERMINAL IDENTIFICATION INFORMATION  :  C C C C C C |
| •                                                                                                        • |
| •                                                                                                        • |
| •                                                                                                        • |
| •                                                                                                        • |
| • N-TH PTT TERMINAL IDENTIFICATION INFORMATION  :  N N N N N N |

F I G. 6

| | |
|---|---|
| • GROUP IDENTIFICATION INFORMATION : * * * * | |
| • POC HOST TERMINAL IDENTIFICATION INFORMATION : * * * * * * * | |
| • FIRST POC TERMINAL IDENTIFICATION INFORMATION : A A A A A A <br> • SECOND POC TERMINAL IDENTIFICATION INFORMATION : B B B B B B <br> • THIRD POC TERMINAL IDENTIFICATION INFORMATION : C C C C C C <br> • <br> • <br> • <br> • <br> • N-TH POC TERMINAL IDENTIFICATION INFORMATION : N N N N N | |
| • EXPIRATION DATE INFORMATION | |

FIG. 7

- GROUP IDENTIFICATION INFORMATION : ****

| TERMINAL IDENTIFICATION INFORMATION | CALL STATUS | POSITIONAL INFORMATION |
|---|---|---|
| • POC HOST TERMINAL IDENTIFICATION INFORMATION  ****** | ON LINE | AREA A |
| • FIRST POC TERMINAL IDENTIFICATION INFORMATION  AAAAA | ON LINE | AREA B |
| • SECOND POC TERMINAL IDENTIFICATION INFORMATION  BBBBB | OFF LINE | AREA A |
| • THIRD POC TERMINAL IDENTIFICATION INFORMATION  CCCCC | OFF LINE | AREA C |
| • | • | • |
| • | • | • |
| • | • | • |
| • N-TH POC TERMINAL IDENTIFICATION INFORMATION  NNNNN | ON LINE | AREA A |

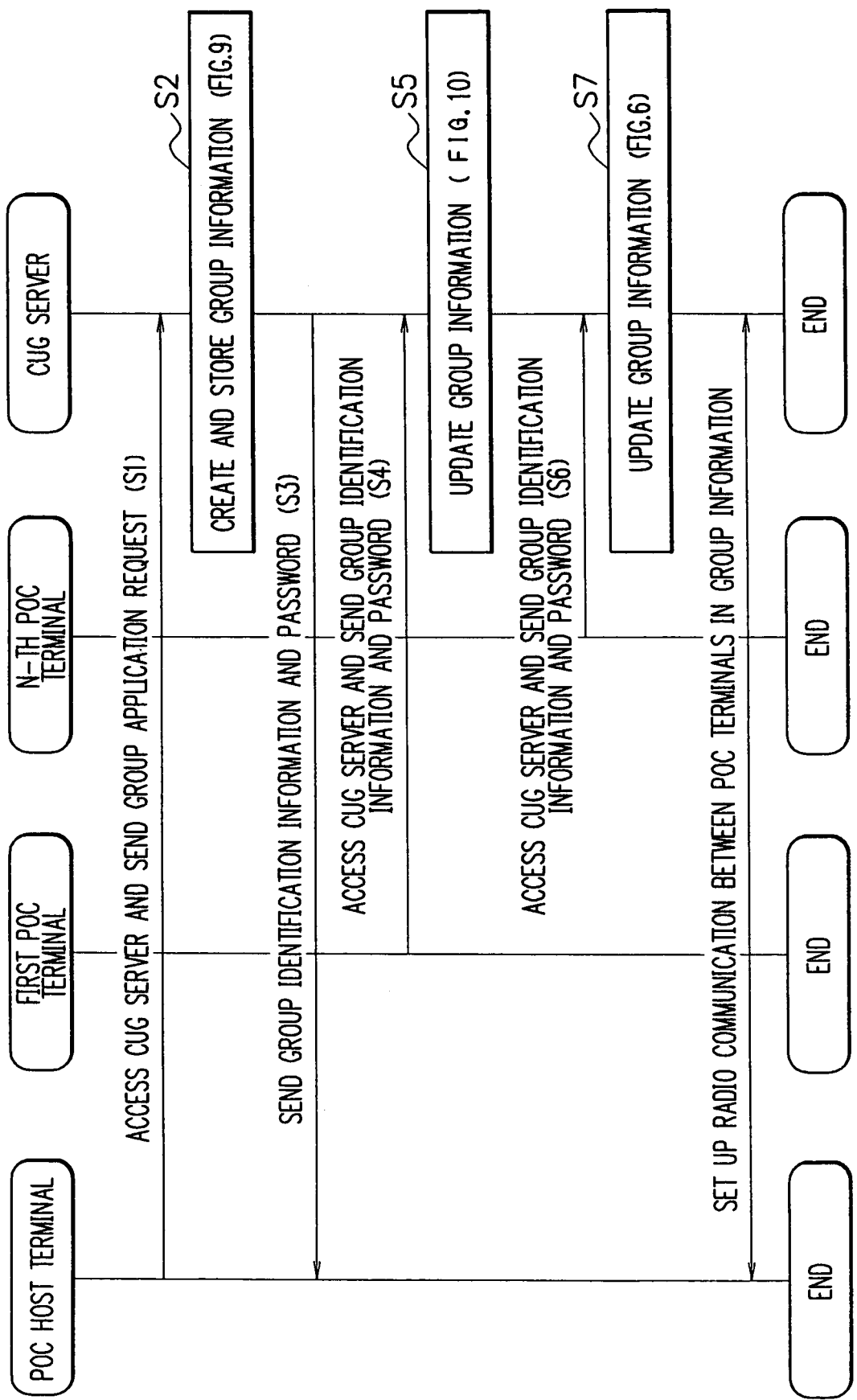

F I G. 9

- GROUP IDENTIFICATION INFORMATION : * * * *
- POC HOST TERMINAL IDENTIFICATION INFORMATION : * * * * * * *

- EXPIRATION DATE INFORMATION

F I G. 10

- GROUP IDENTIFICATION INFORMATION : * * * *
- POC HOST TERMINAL IDENTIFICATION INFORMATION : * * * * * * *
- FIRST POC TERMINAL IDENTIFICATION INFORMATION : A A A A A A

- EXPIRATION DATE INFORMATION

FIG. 11

| |
|---|
| • GROUP IDENTIFICATION INFORMATION    : * * * * |
| • POC HOST TERMINAL IDENTIFICATION INFORMATION    : * * * * * * * |
| • FIRST POC TERMINAL IDENTIFICATION INFORMATION    :  A A A A A A<br>• SECOND POC TERMINAL IDENTIFICATION INFORMATION  :  B B B B B B<br>• THIRD POC TERMINAL IDENTIFICATION INFORMATION   :  C C C C C C<br>　　　　　　　•　　　　　　　　　　　　　　　　　　•<br>　　　　　　　•　　　　　　　　　　　　　　　　　　•<br>　　　　　　　•　　　　　　　　　　　　　　　　　　•<br>　　　　　　　•　　　　　　　　　　　　　　　　　　•<br>• N-TH POC TERMINAL IDENTIFICATION INFORMATION   :  N N N N N N |
| • EXPIRATION DATE INFORMATION |
| • PASSWORD |

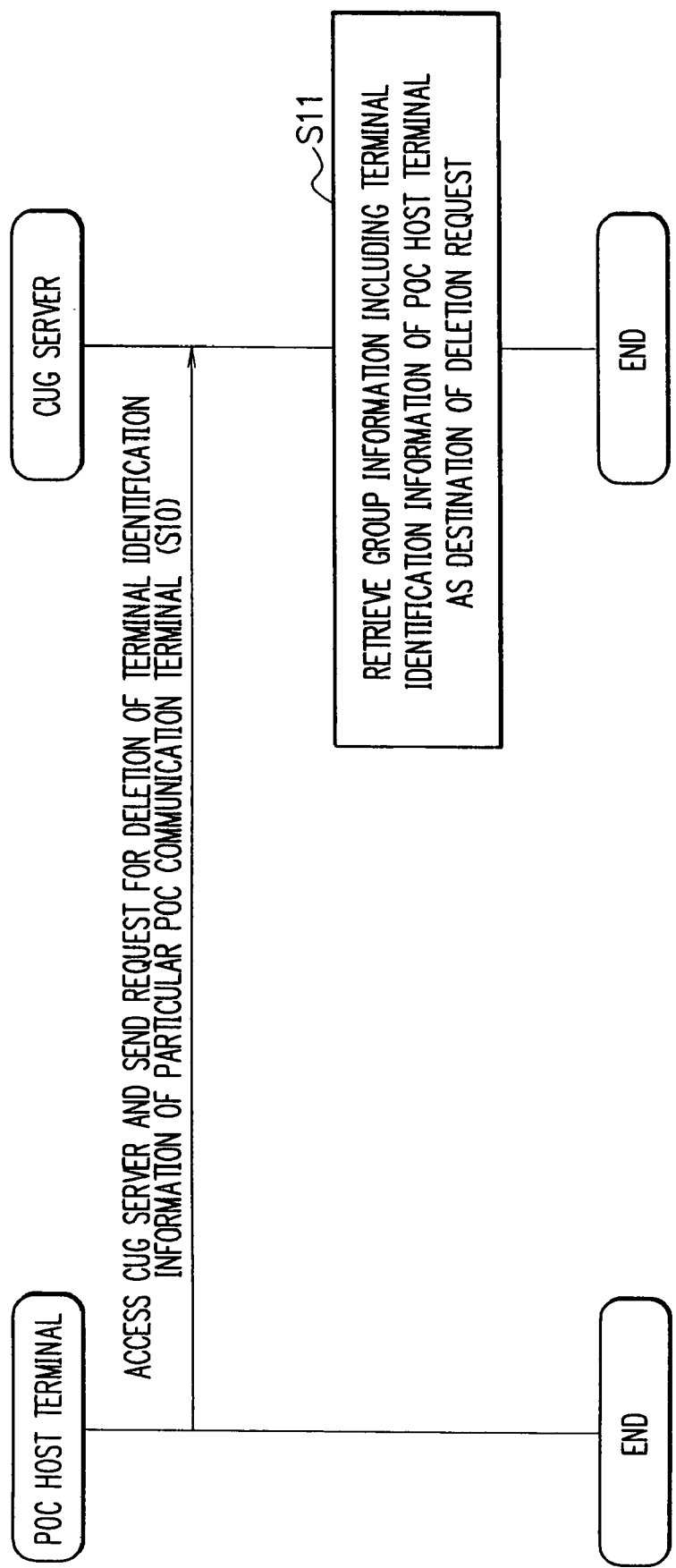

CONTROL STATION, A WIRELESS COMMUNICATION SYSTEM AND A WIRELESS COMMUNICATION METHOD

BACKGROUND OF THE INVENTION

The present invention relates to a control station, a wireless communication system, and a wireless communication method in which wireless communication is set up between particular communication terminal devices using a press-to-talk switch, and in particular, to a control station, a wireless communication system, and a wireless communication method in which wireless communication is established in a so-called closed user group (CUG), namely, a group including a particular number of persons. "Press-to-talk switch" is used to set up wireless communication. Specifically, when a user of a communication terminal depresses a predetermined button of the terminal, wireless communication with a communicating party is established.

DESCRIPTION OF THE PRIOR ART

In recent services using wireless communication, there has been known a wireless communication system using Push To Talk (PTT; registered trademark).

One of such communication systems is the integrated digital enhanced network (iDEN; registered trademark) of Motorola (registered trademark) employing a comprehensive or integrated digital wide area network. The system includes an enhanced base transceiver system (EBTS) to conduct half-duplex communication of information using PTT between particular communication terminals beforehand registered to one group. Audio information is transferred between user stations in the communication system (reference is to be made to, e.g., "iDEN Technical Overview" Aug. 8, 2000; <URL: http//idenphones.motorola.com/iden/developer/developer_technical_linf o.jsp>Download the Complete iDEN System Overview pdf (2.7 Mb); Chap. 4: Dispatch Call Processing, 4-3; Dispatch Location Area, FIG. 4-3 Simplified Dispatch Diagram).

Besides, as a technique concerning a system for managing a closed user group network such as a virtual private network (VPN) in which communication is held within a group including a particular number of members through the use of the Internet as a backbone network, there has been proposed a closed user group network managing system in Japanese Patent Application laid open No. 2000-244508. The closed user group network managing system is improved in efficiency in setting for member addition.

In the closed user group network managing system, when the information on a CUG number to add a member, the member to be added and the connection node thereof is inputted to a user interface part. Accordingly, the member is added to the member table for CUG of the connection node by a member information adding part, and a node is added to the item for CUG of a node information database by a node information adding part. Then, the information as to all nodes belonging to the CUG is collected by a node information collecting part, and entries in relevant routing tables for CUG are collected from respective nodes by a routing information collecting part. Subsequently, the entries in routing tables of the node to connect the additional member and all the nodes belonging to the CUG thereof are added by a routing table adding part. Thereby, a member can be added to a group if only an operator inputs information on the member to be added, a CUG number, and the connection node thereof to the user interface part.

As can be seen from FIG. 1, the conventional radio communication system using the press-to-talk switch is a wireless communication system including a plurality of PTT communication terminals 1000-1 to 1000-N (N is an integer), a PTT server 2000 for setting up wireless communication between the terminals 1000-1 to 1000-N, and a CUG server 3000 for controlling group information of the PTT communication terminals 1000-1 to 1000-N to conduct radio communication between particular ones of the terminals 1000-1 to 1000-N. To operate the system, it is required for a user or an operator using an information processor such as a personal computer (PC) to register to the CUG server 3000 group application or notification information to establish radio communication between particular ones of the terminals 1000-1 to 1000-N. The group application information includes predetermined information such as group identification information to identify a group table to be created by the CUG server 3000 and terminal identification information to identify the terminals for the radio communication among the PTT communication terminals registered to the group table identified by the group identification information. According to the group identification information, the CUG server 3000 creates a group table to establish radio communication between the particular terminals as shown in FIG. 2. This resultantly makes it possible to set up wireless communication between the specified PTT communication terminals 1000-1 to 1000-N. As can be seen from FIG. 2, the group table controlled by the CUG server 3000 includes entries each of which includes group identification information to identify a group table to establish radio communication between the terminals 1000-1 to 1000-N and terminal identification information to identify the terminals for which wireless communication processing is to be executed. Referring now to FIG. 3, description will be given of the radio communication processing in the wireless communication system of the prior art shown in FIG. 1.

First, the user registers, by use of his or her information processor such as a PC, to the CUG server 3000 the group application information including necessary information such as group identification information to identify a group table to be created by the CUG server 3000 and terminal identification information to identify the terminals for the radio communication among the PTT communication terminals registered to the group table identified by the group identification information. Using the group identification information, the CUG server 3000 produces a group table to establish radio communication between the particular terminals 1000-1 to 1000-N. The CUG server 3000 then assigns to the group table to obtain group information and stores the group information in a storage thereof (step S101). As a result, it is possible to set up wireless communication between the particular PTT communication terminals 1000-1 to 1000-N.

When a press-to-talk switch of a first PTT communication terminal is depressed, the first terminal sends a call issuance request to a second PTT communication terminal included in the group information (step S102). Having received the call issuance request from the first terminal, the PTT server 2000 makes a check to confirm whether or not group information to which the first terminal belongs exists in the PTT server 2000. If it is determined that such group information does not exist in the PTT server 2000, the PTT server 2000 transmits an authentication request of the first terminal to the CUG server 3000 (step S103).

When the authentication request is received, the CUG server 3000 confirms whether or not terminal identification information of the first terminal is present in group information controlled in a storage of the CUG server 3000. The CUG server 300 then sends a response of authentication of the first terminal to the PTT server 2000 (step S104). When the PTT server 2000 receives from the CUG server 3000 group information including terminal identification information of the first terminal as the authentication response, the PTT server 2000 stores therein the group information (step S105).

The PTT server 2000 sends, to the second PTT communication terminal registered to the group information, information of voices and sounds sent from the first terminal (step S106). When the press-to-talk switch is released in the first terminal, transmission of the audio information from the first terminal is terminated.

In the state in which the group information including the identification information of the first terminal is stored in the PTT server 2000, when a press-to-talk switch of the second terminal is depressed, the second terminal transmits to the PTT server 2000 a call issuance request to the first PTT terminal included in the group information (step S107). Having received the call issuance request from the second terminal, the PTT server 2000 sends, to the first terminal included in the group information to which the second terminal belongs, information such as sounds and voices sent from the second terminal (step S108). As above, in the conventional wireless communication system, the group application information to set up radio communication between the particular PTT communication terminals 1000-1 to 1000-N is registered to the CUG server 3000 such that radio communication is established between the terminals included in the group information created according to the group application information.

In the radio communication system of the prior art, since the CUG server 3000 creates and controls the group information according to the group application information to set up radio communication between the PTT communication terminals, it is possible to establish radio communication only between the PTT communication terminals 1000-1 to 1000-N included in the group information controlled by the CUG server 3000. Therefore, to establish radio communication between an unregistered PTT communication terminal not registered to the group information controlled by the CUG server 3000 and a registered PTT communication terminal registered to the group information, it is required that terminal identification information of the unregistered PTT communication terminal is additionally registered to the group information controlled by the CUG server 3000 by use of an information processor such as a PC as in step S101. However, the operation in which the unregistered PTT communication terminal is registered to the group information controlled by the CUG server 3000 and radio communication is set up between the unregistered terminal and the registered terminal takes a long period of time. Therefore, an unregistered PTT communication terminal cannot establish radio communication in a short period of time. This consequently restricts utilization modes of radio communication using the press-to-talk switch.

According to the technique described in "iDEN Technical Overview" of Motorola above, when the operator inputs information items such as a CUG number to additionally register a member, a member for addition, and a connection node to the user interface, the member can be automatically added to the system. However, an automatic member addition by use of a terminal device has not been considered in the description. In accordance with the present invention of this application, for all nodes to which the members of the CUG are connected, the system does not set an entry of a routing table possessed by a node to which the member to be added is connected.

SUMMARY OF THE INVENTION

It is therefore an object of the present invention to provide a control station, a radio communication system, and a radio communication method by which a communication terminal can be easily registered as a new mobile station to group information to set up radio communication between communication terminals as particular mobile stations. This advantageously mitigates restrictions imposed onto utilization modes in the radio communication using a press-to-talk switch, and a user additionally registered to the group information can conduct radio communication in a short period of time.

To achieve the object above, the present invention has aspects as below.

In accordance with the present invention, there is provided a control station for setting up radio communication between a plurality of mobile stations conducting radio communication using a press-to-talk switch. The control station includes a group information storage for creating, when a group application request to establish radio communication between particular mobile stations is received from a particular communication device, a group table to set up radio communication between the mobile stations, generating group information by adding group identification information identifying the group table to the group table thus created, and storing the group information therein; a group identification information transmitting unit for transmitting the group identification information assigned to the group table to the communication device as a source of the group application request; a registering unit for registering, when a registration request to the group table and the group identification information are received from the mobile station side, information of a mobile station as a source of the registration request to a group table assigned with the group identification information received from the mobile station side; and a radio communication establishing unit for setting up radio communication between mobile stations registered to the group table.

In the control station, the registering unit retrieves from the group information thus stored a group table assigned with group identification information matching the group identification information received from the mobile station side and registers information of the mobile station as the source of the registration request to the group table.

The control station further includes a unit for transmitting grant information to allow the registration request to the group table to the communication device as the source of the group application request. The registering unit registers, when the grant information is received, information of the mobile station as the source of the registration request to the group table.

In the control station, the grant information is created when the group table is generated, and the group information is created by assigning the grant information to the group table. The registering unit registers information of the mobile station as the source of the registration request to the group table only when the grant information received from the transmitting unit matches the grant information assigned to the group table.

The control station further includes a unit for registering information of a mobile station controlling the group table to the group table created when the group application request is received from the particular communication device.

In the control station, the particular communication device is a mobile station and information of the mobile station controlling the group table is registered to the group table created when the group application request is received from the particular communication.

The control station further includes a deleting unit for deleting, when a deletion request of a mobile station from the group table is received from the particular communication, information of a mobile station as an object of deletion.

In the control station, the particular communication device is a mobile station controlling the group table and the deleting unit retrieves, only when a deletion request of a mobile station from a group table to which information of the mobile station is registered is received from the mobile station controlling the group table, the group table to which information of the mobile station is registered and deletes information of the mobile station as an object of deletion from the group table.

In the control station, the radio communication establishing unit retrieves, when a setup request of radio communication between mobile stations registered to the group table is received from the mobile station side, a group table including information of a mobile station as a source of the setup request from the group information and establishes radio communication between mobile stations registered to the group table.

In accordance with the present invention, there is provided a radio communication system including a plurality of mobile stations conducting radio communication using a press-to-talk switch, a particular communication device, and a control station for establishing radio communication between a plurality of mobile stations. The control station includes a group information storage for creating, when a group application request to establish radio communication between particular mobile stations is received from the particular communication device, a group table to set up radio communication between the particular mobile stations, generating group information by adding group identification information identifying the group table to the group table thus created, and storing the group information therein; a group identification information transmitting unit for transmitting the group identification information assigned to the group table to the communication device as a source of the group application request, a registering unit for registering, when a registration request to the group table, the group identification information, and information of the mobile station are received from the mobile station side, the information of the mobile station to a group table assigned with the group identification information received from the mobile station side; and a radio communication establishing unit for setting up, when a setup request of radio communication between mobile stations registered to the group table is received from the mobile station side, radio communication between the mobile stations registered to the group table. The particular communication device includes a transmitting unit for sending the control station a group application request to establish radio communication between particular mobile stations and a receiving unit for receiving the group identification information from the control station. Each of the mobile stations includes a group registration request unit for sending the control station a registration request to register information thereof to the group table, group identification information to identify the group table, and information of the mobile station and a radio communication setup request unit for sending the control station a setup request to establish radio communication between mobile stations registered to the group table to which the information of the mobile station is registered.

In the radio communication system, the control station retrieves, when the registration request to the group table, the group identification information, and the information of the mobile station are received from the mobile station side, a group table assigned with group identification information matching that received from the mobile station side from the group information stored in the control station and then registers the information of the mobile station to the group table.

In the radio communication system, the control station includes a unit for transmitting grant information to allow the registration request to the group table to the particular communication device as the group application request source. The particular communication device includes a unit for receiving the grant information from the control station. The mobile station includes a unit for sending the control station a registration request to register information thereof to the group table, group identification information to identify the group table, information of the mobile station, and the grant information. The control station registers, when the grant information is received from the mobile station, the information of the mobile station to the group table.

In the radio communication system, the control station creates the grant information when the control station generates the group table, and produces the group information by assigning the grant information to the group table. The control station registers the information of the mobile station to the group table only when the grant information received by the control station matches the grant information assigned to the group table.

In the radio communication system, the control station includes a unit for creating, in the group table created when the group application request is received from the particular communication device, information of a mobile station controlling the group table.

In the radio communication system, the particular communication device is a mobile station and the control station registers information of the mobile station controlling the group table to the group table created when the group application request is received from the mobile station.

In the radio communication system, the particular communication device includes a unit for transmitting a deletion request of a mobile station from the group table to the control station and the control station includes a deleting unit for deleting, when the deletion request of a mobile station from the group table is received, information of the mobile station associated with the deletion request from the group table.

In the radio communication system, the particular communication device is a mobile station controlling the group table and the control station retrieves, only when the deletion request of a mobile station from a group table to which information of the mobile station is registered is received from the mobile station controlling the group table, the group table to which information of the mobile station is registered and deletes information of the mobile station as an object of deletion from the group table.

In the radio communication system, the control station retrieves, when the setup request of radio communication between mobile stations registered to the group table is received from the mobile station side, a group table including information of the mobile station side as a source of the setup request from the group information and establishes radio communication between mobile stations registered to the group table.

In accordance with the present invention, there is provided a radio communication method for use with a system including a plurality of mobile stations conducting radio communication therebetween using a press-to-talk switch, a particular communication device, and a control station for establishing radio communication between a plurality of mobile stations. The method includes the steps of transmitting by the particular communication device a group application request to the control station to establish radio communication between particular mobile stations; creating by the control station, when the group application request is received from the particular communication device, a group table to set up radio communication between the particular mobile stations, generating group information by adding group identification information identifying the group table to the group table thus created, and storing the group information in a storage thereof; transmitting by the control station the group identification information assigned to the group table to the communication device as a source of the group application request; receiving by the particular communication device the group identification information from the control station; transmitting by the mobile station a registration request to the control station to register information thereof to the group table, group identification information to identify the group table, and information of the mobile station; registering by the control station, when the registration request to the group table, the group identification information, and the information of the mobile station are received from the mobile station side, the information of the mobile station to the group table assigned with the group identification information received from the mobile station side; transmitting by the mobile station a setup request to the control station to set up radio communication between mobile stations registered to the group table to which the information of the mobile station is registered; and establishing by the control station, when the setup request of radio communication between the mobile stations is received from the mobile station side, radio communication between the mobile stations registered to the group table.

In the radio communication method, the control station retrieves, when the registration request to the group table, the group identification information, and the information of the mobile station are received from the mobile station side, a group table assigned with group identification information matching that received from the mobile station side from the group information stored in the control station and then registers the information of the mobile station to the group table.

The radio communication method further includes the steps of transmitting by the control station grant information to allow the registration request to the group table to the particular communication device as the group application request source, receiving by the particular communication device the grant information from the control station; transmitting by the mobile station a registration request to the control station to register information thereof to the group table, group identification information to identify the group table, information of the mobile station, and the grant information; and registering by the control registers, when the grant information is received from the mobile station, the information of the mobile station to the group table.

The radio communication method further including the steps of creating by the control station the grant information when the control station generates the group table, and producing the group information by assigning the grant information to the group table, and registering by the control station the information of the mobile station to the group table only when the grant information received from the mobile station matches the grant information assigned to the group table.

The radio communication method further including the step of registering by the control station, to the group table created when the group application request is received from the particular communication device, information of a mobile station controlling the group table.

In the radio communication method, the particular communication device is a mobile station. The method further includes the step of registering by the control station information of the mobile station controlling the group table to the group table created when the group application request is received from the mobile station.

The radio communication method further includes the steps of transmitting by the particular communication device a deletion request of a mobile station from the group table to the control station and deleting by the control station, when the deletion request of a mobile station from the group table is received, information of the mobile station associated with the deletion request from the group table.

In the radio communication method, the particular communication device is a mobile station controlling the group table. The method further includes the step of retrieving by the control station, only when the deletion request of a mobile station in a group table to which information of the mobile station is registered is received from the mobile station controlling the group table, the group table to which information of the mobile station is registered and deletes information of the mobile station as an object of deletion from the group table.

The radio communication method further includes the step of retrieving by the control station, when the setup request of radio communication between mobile stations registered to the group table is received from the mobile station side, a group table including information of the mobile station side as a source of the setup request from the group information and establishing radio communication between mobile stations registered to the group table.

The control station in accordance with the present invention is a control station for setting up radio communication between a plurality of mobile stations conducting radio communication using a press-to-talk switch. The control station creates, when a group application request to establish radio communication between particular mobile stations is received from a particular communication device, a group table to set up radio communication between the mobile stations. The control station generates group information by adding group identification information identifying the group table to the group table thus created to store the group information therein. The control station transmits the group identification information assigned to the group table to the communication device as a source of the group application request. When a registration request to the group table and the group identification information are received from the mobile station side, the control station registers information of a mobile station as a source of the registration request to a group table assigned with the group identification information received from the mobile station side and then establishes radio communication between mobile stations registered to the group table. As a result, to group information to set up radio communication between communication terminals as particular mobile stations, it is facilitated to additionally register a new mobile station, i.e., a communication terminal. This mitigates restrictions imposed on the utilization modes in the radio communication using a press-to-talk switch, and a user additionally registered to the group information can conduct radio communication in a short period of time.

In the radio communication system and the radio communication method in accordance with the present invention, there are included a plurality of mobile stations conducting radio communication using a press-to-talk switch, a particular communication device, and a control station for establishing radio communication between a plurality of mobile stations. The particular communication device transmits a group application request to establish radio communication between particular mobile stations to the control station. Having received the request, the control station creates a group table to set up radio communication between the particular mobile stations, generates group information by adding group identification information identifying the group table to the group table thus created, and stores the group information in a storage thereof. The controller sends the group identification information assigned to the group table to the communication device as a source of the group application request. The communication device resultantly receives the group identification information from the control station. The mobile station sends a registration request thereof to the group table, group identification information to identify a group table for the request, and information of the mobile station to the control station. When these items are received from the mobile station side, the control station registers the information of the mobile station to a group table assigned with the group identification information received from the mobile station side. The mobile station sends a setup request of radio communication between mobile stations registered to the group table to the control station. When the setup request is received from the mobile station side, the control station establishes radio communication between the mobile stations registered to the group table. Consequently, it is facilitated to additionally register a new mobile station, i.e., a communication terminal to the group information to set up radio communication between communication terminals as particular mobile stations. Therefore, the restrictions imposed on utilization modes in the radio communication using a press-to-talk switch is mitigated and a user additionally registered to the group information can conduct radio communication in a short period of time.

BRIEF DESCRIPTION OF THE DRAWINGS

The objects and features of the present invention will become more apparent from the consideration of the following detailed description taken in conjunction with the accompanying drawings in which:

FIG. 2 is a table showing a layout example of a group table under supervision of the CUG server in the conventional radio communication system;

FIG. 6 is a schematic block diagram showing a layout of group information controlled by a CUG server in the radio communication system in accordance with the present invention;

FIG. 7 is a block diagram showing a control table supervised by a presence server in the radio communication system in accordance with the present invention;

FIG. 8 is an operation sequence chart showing a method of creating the group information controlled by a CUG server in the radio communication system in accordance with the present invention;

FIG. 9 is a table showing a first state of group information supervised by a CUG server in which only terminal identification information of a POC host communication terminal is registered to the group information;

FIG. 10 is a table showing a second state of group information controlled by a CUG server in which terminal identification information items of a POC host communication terminal and a first POS communication terminal are registered to the group information;

FIG. 11 is a table showing a layout example of the group information supervised by a CUG server in the radio communication system in accordance with the present invention; and FIG. 12 is an operation sequence chart showing a method of deleting the terminal identification information of the POC communication terminal from the group information under control of a CUG server in the radio communication system in accordance with the present invention.

DESCRIPTION OF THE EMBODIMENTS

Figure 1:
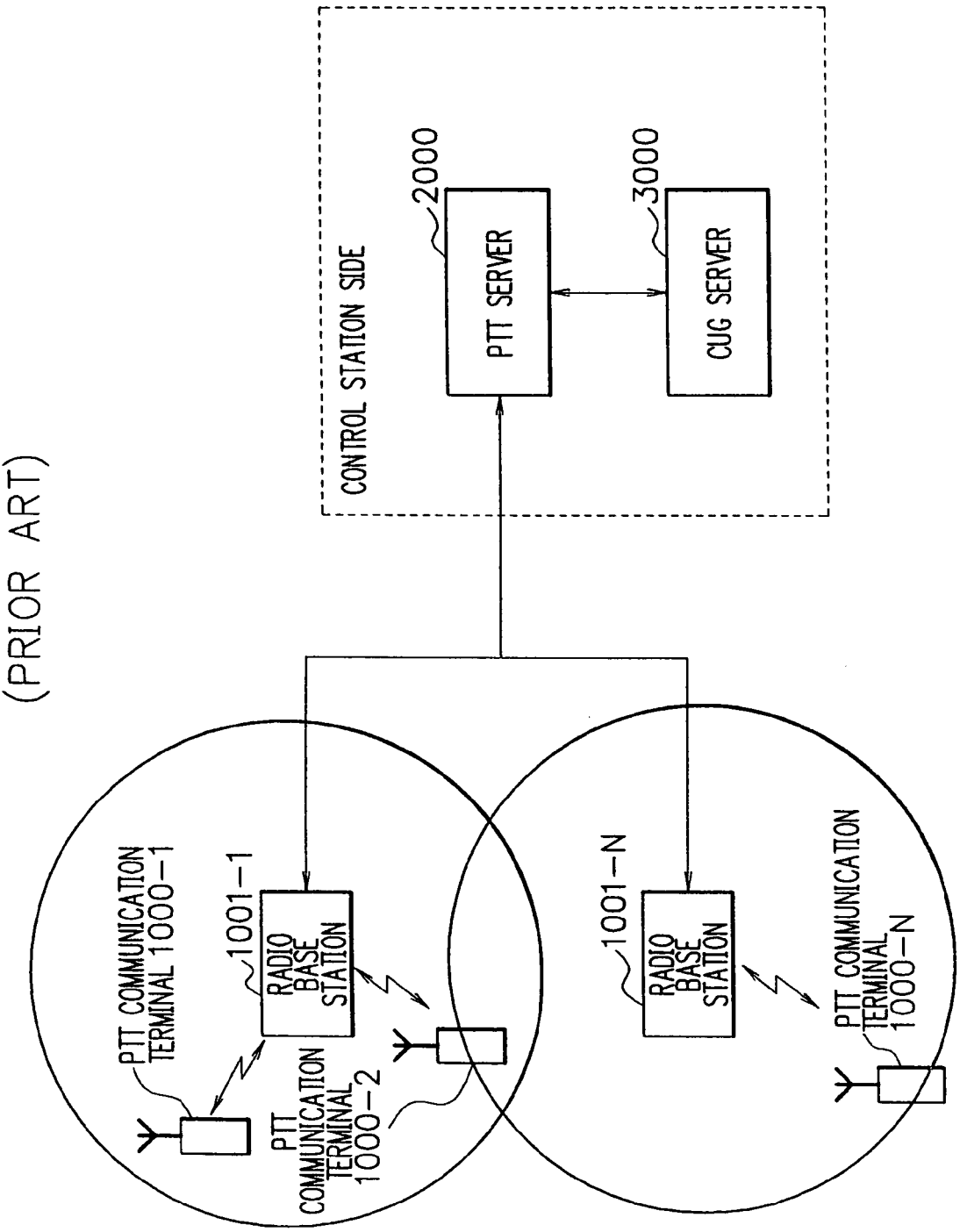
FIG. 1 is a schematic block diagram showing a radio communication system of the prior art.
Figure 3:
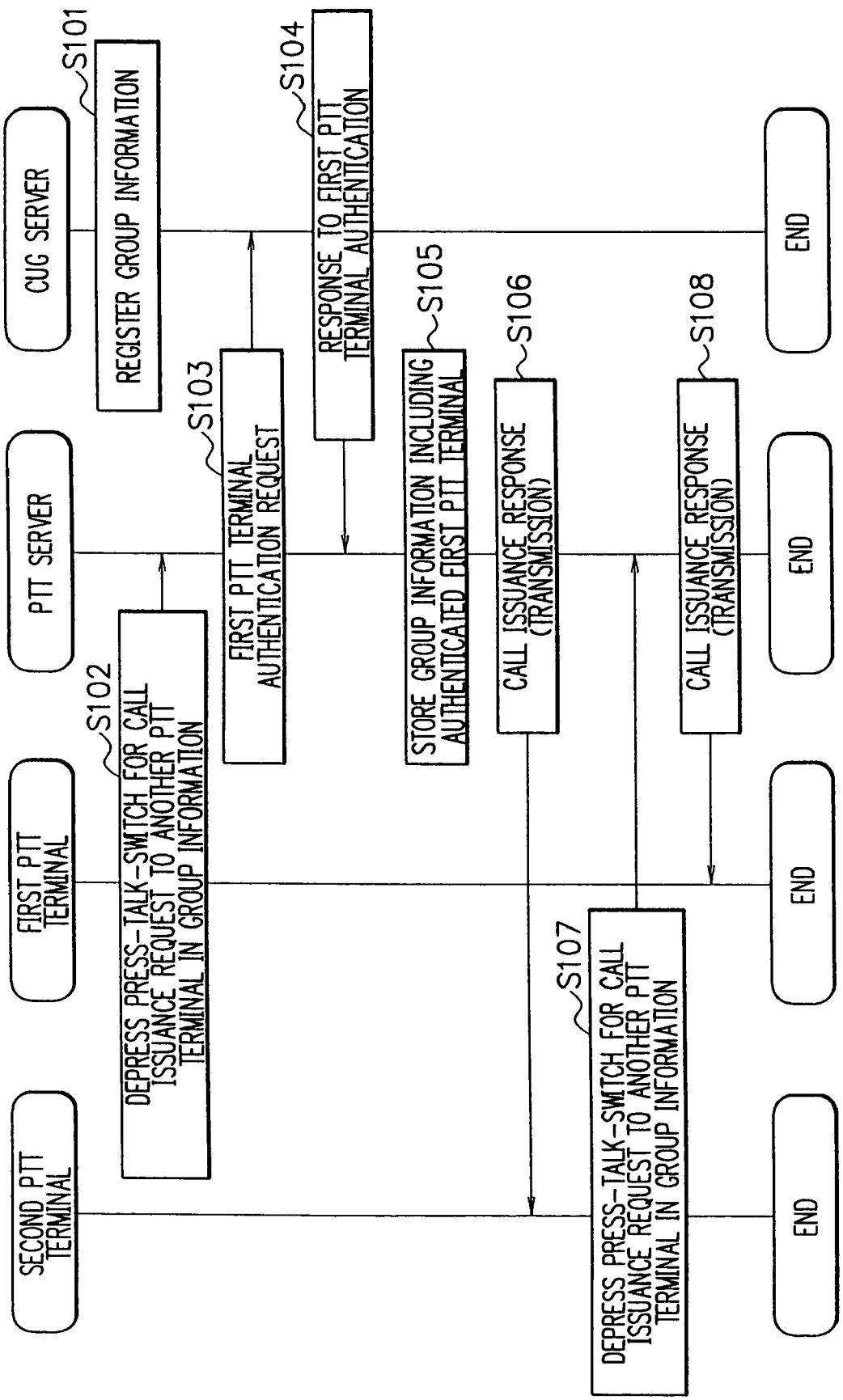
FIG. 3 is an operation sequence chart to explain a method of establishing radio communication between communication terminals in the radio communication system of the prior art.
Figure 4:
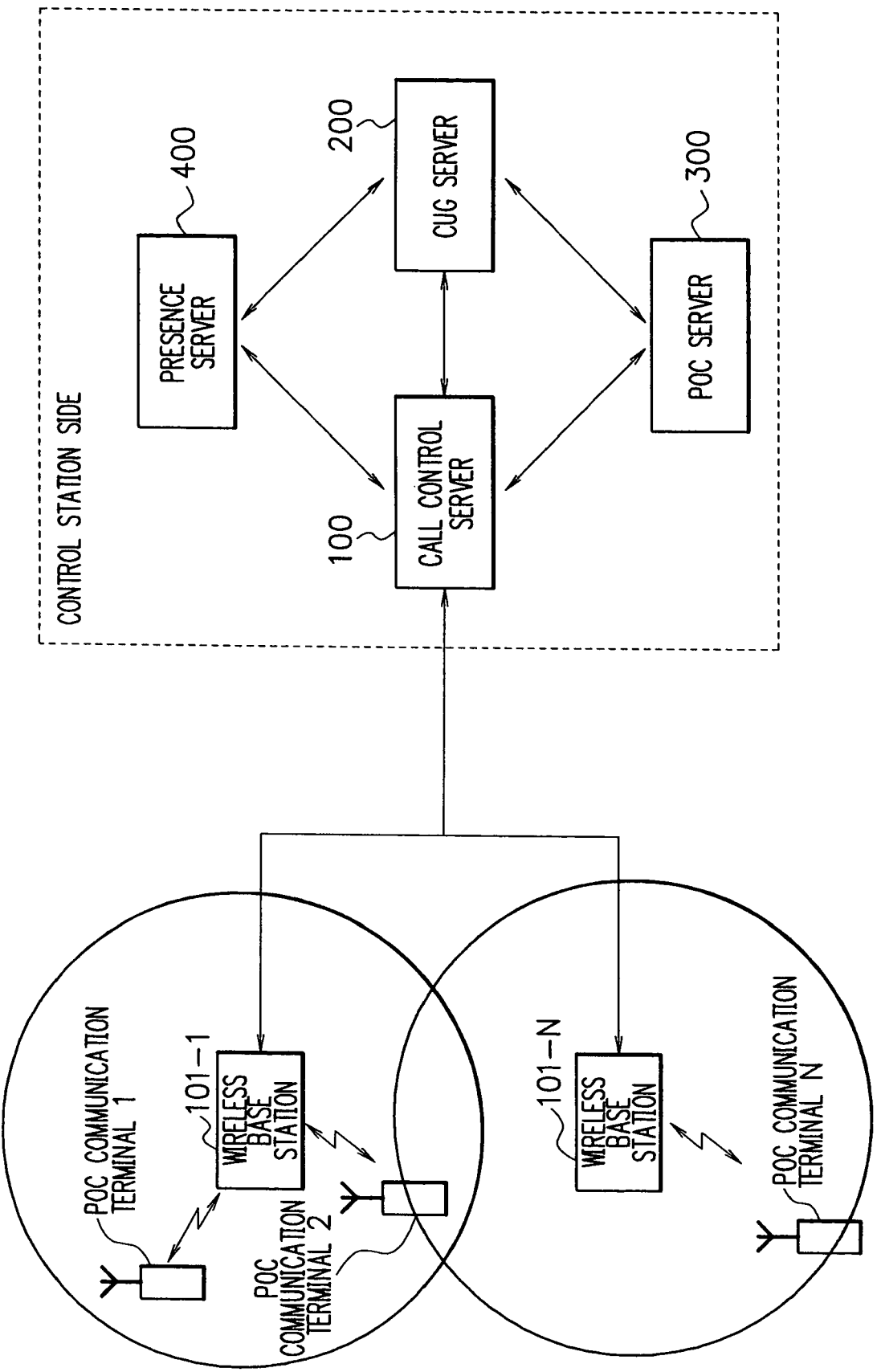
FIG. 4 is a block diagram showing a system configuration of a radio communication system in accordance with the present invention.

Referring next to FIG. 4, description will be given of an aspect of a radio communication system in accordance with the present invention.

The communication system includes POC communication terminals 1 to N (N is an integer) serving as a plurality of mobile stations to conduct wireless communication using a press-to-talk switch, communication devices such as POC host communication terminals or information processors, e.g., PCs, and a control station side or group to set up radio communication between the communication terminals 1 to N. The control station group includes a call control server 100, a CUG server 200, a POC server 300, and a presence server 400. Each of the communication devices, for example, POC host communication terminals or information processors such as a PC sends the control station side a group application request to establish radio communication between the POC communication terminals 1 to N. When the request is received from the communication device, the control station side generates a group table to establish wireless communication between the terminals 1 to N, creates group information by assigning group identification information identify the group table to the group table, and stores the group information in a storage on the control station side. The control station group then transmits the group identification information to the communication device as a source of the group application request. Resultantly, the communication device receives the group identification information. The POC communication terminal as a mobile station sends the control station side a registration request to register terminal identification information thereof to the group table, group identification information to identify the group table of the destination of registration, and terminal identification information of the mobile station. When the registration request for registration to the group table, the group identification information, and the terminal identification information of the mobile station are received from the mobile station side, the control station group registers the terminal identification information of the communication terminal as the mobile station to the group table associated with the group identification information. The POC communication terminal sends the control side a request to set up radio communication between the POC communication terminals registered to the group table to which the terminal identification information of the POC communication terminal is registered. Having received the request from the communication terminal, the control station side establishes wireless communication between the POC communication terminals. This resultantly makes it possible to additionally register the POC communication terminal as a mobile station to the group information to set up radio communication between the particular POC communication terminals. This also mitigates restrictions imposed on utilization modes in the radio communication using the press-to-talk switch. It is possible that a user added to the group information can start radio communication in a short period of time. The radio communication system can also be configured in accordance with the present invention as below. The control station group transmits a password as grant information to accept a registration request to a group table to a communication device having issued a group application request such as a POC host communication terminal or an information processor, for example, a PC. The communication terminal as the mobile station sends terminal identification information thereof, the registration request for the group table, the group identification information to identify the group table, the terminal identification information of the mobile station, and the password as grant information to the control station group. When the password as grant information is received from the mobile station side, the control station group registers the terminal identification information of the communication terminal as the mobile station to the group table. This advantageously improves security in the registration of the terminal identification information of the mobile station to the group table.

First Embodiment

Referring now to the accompanying drawings, description will be given of an embodiment in accordance with the present invention.

Description will be first given of a system configuration of a radio communication system in accordance with the present invention referring to FIG. 4.

The wireless communication system includes a mobile station side including POC (Push to talk Over Cellular) communication terminals 1 to N (N is an integer) each of which includes a transceiver function to serve as a mobile station to conduct wireless communication using a press-to-talk switch and a control station side including a call control server 100 to set up radio communication between the terminals 1 to N, a CUG server 200 to control group information between the terminals 1 to N conducting wireless communication, a POC server 300 which attains the group information between the communication terminals 1 to N under control of the CUG server 200 to control radio communication between the communication terminals 1 to N by the call control server 100, and a presence server 400 to control latest device states or statuses of the POC communication terminals 1 to N registered to the group information controlled by the CUG server 200 such as positional information of the POC communication terminals and call statuses thereof.

POC Communication Terminals 1 to N

In each of the POC communication terminals 1 to N, when a predetermined button, i.e., a press-to-talk switch thereof is depressed, radio communication is carried out between POC communication terminals contained in the group information including the terminal identification of the pertinent terminal.

Figure 5:
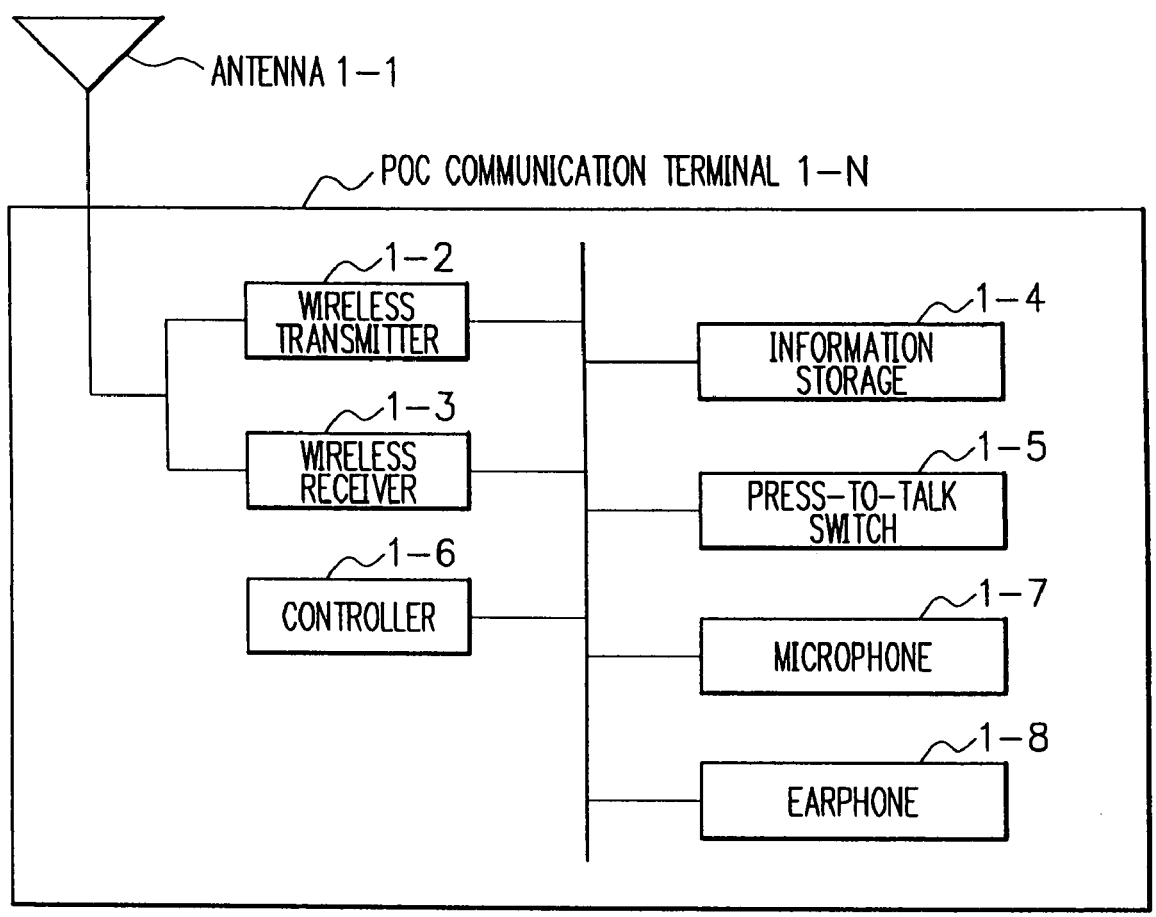
FIG. 5 is a block diagram showing a functional configuration of a push to talk over cellular (POC) communication terminal in the radio communication system in accordance with the present invention.

As can be seen from FIG. 5, the terminal (1 to N) includes an antenna section 1-1, a radio or wireless transmitter section 1-2, a radio or wireless receiver section 1-3, an information storage 1-4, a press-to-talk switch 1-5, a controller 1-6, a microphone 1-7, and an earphone 1-8.

The information storage 1-4 is a storing section to store therein group information required to conduct wireless communication between the POC communication terminals belonging to a particular group. Using the group information, call control is established with respect to the control station side to conduct radio communication with a POC communication terminal associated with terminal identification information contained in group information under controlled by the CUG server 200.

In a case in which a POC communication terminal is used to send audio information to a POC communication terminal associated with terminal identification information in the group information supervised by the CUG server 200, the press-to-talk switch 1-5 of the terminal is first depressed. As a result, audio information obtained via the microphone 1-7 is fed to the wireless transmitter 1-2 to be modulated for radio communication and is then sent from the antenna 1-1. Audio information transmitted from an external POC communication terminal is received via the wireless receiver 1-3 to be reproduced by the earphone 1-8.

Call Control Server 100

The control server 100 is a processing device included in the control station group to establish radio communication between the POC communication terminals 1 to N. The server 100 stores group information controlled by the CUG server 200 to set up radio communication between the POC communication terminals contained in the group information. The server 100 is coupled with a plurality of wireless base stations 101-1 to 101-N, the CUG server 200, the POC server 300, and the presence server 400. Although not shown in FIG. 4, the call control server 100 may also be coupled via the Internet with an information processor such as a PC.

CUG Server 200

The CUG server 200 is a processing device on the control station side and controls group information between the POC communication terminals conducting radio communication via the POC server 300. In operation, the CUG server 200 creates a group table as fundamental information of group information shown in FIG. 6, adds or assigns group identification information to the group table to identify the table, and stores the table in a storage thereof. As shown in FIG. 6, the group information controlled by the CUG server 200 includes group identification information to identify a group table to set up radio communication between the POC communication terminals, terminal identification information to identify a POC communication terminal to establish radio communication between the POC communication terminals registered to the group table, an expiration data information to indicate a valid period of time such as one day, one week, or no limitation for the setup of radio communication between the POC communication terminals registered to the group table. The terminal identification information includes terminal identification information, i.e., POC terminal identification information of a POC host communication terminal as a host to control the POC communication terminals conducting radio communication in the group table and POC terminal identification information, i.e., terminal identification information of the first to N-th POC communication terminals conducting radio communication in the group table.

POC Server 300

The POC server 300 is a processing unit of the control station group to set up radio communication between the POC communication terminals 1 to N. The POC server 300 attains group information of POC communication terminals under control of the CUG server 200 and then achieves, according to the group information, a call control operation between the POC communication terminals in the call control server 100. The POC server 300 controls wireless communication between the POC communication terminals and the call control server 100.

In the radio communication system configured as shown in FIG. 4, to set up radio communication between the POC communication terminals on the control station side, a call issuance request of a POC communication terminal sent from the POC communication terminal is delivered via a radio base station (101-1 to 101-N) to the call control server 100. Thereafter, the server 100 sends the call issuance request to the POC server 300. According to the call issuance request from the call control server 100, the server 300 executes authentication processing for the POC communication terminal having transmitted the call issuance request on the basis of the group information controlled by the CUG server 200. Through the authentication processing, the POC server 300 attains the group information including terminal identification information of. POC communication terminals under control of the CUG server 200. The POC server 300 then makes the call control server 100 conduct a call control operation between the POC communication terminals in the group information acquired from the CUG server 200. When audio information sent from the POC communication terminal is fed via the radio base station to the call control server 100, the server 100 transmits the audio information to the POC communication terminal for which radio communication is set up according to the group information obtained from the CUG server 200.

Presence Server 400

The presence server 400 is a processor included in the control station group to establish radio communication between the POC communication terminals 1 to N. The server 400 controls latest device statuses of the POC communication terminals contained in the group information supervised by the CUG server 200 such as positional information and call statuses of the POC communication terminals.

The presence server 400 includes a device status detector section, not shown, to detect device statuses of the POC communication terminals included in the group information under control of the CUG server 200 and a device status storage, not shown, to store device statuses of the POC communication terminals. The device status storage controls device statuses of the POC communication terminals using a control table similar in the configuration to the group table of the CUG server 200, for example, as shown in FIG. 7. The control table of FIG. 7 includes group identification information contained in the group information of FIG. 6 controlled by the CUG server 200, a call status of each POC communication terminal, and positional information of each POC communication terminal. However, this example does not restrict the control table supervised by the presence server 400. The control table is not particularly restricted only if the presence server 400 can control, by use of the control table, the latest device statuses of the POC communication terminals in the group information controlled by the CUG server 200. The POC communication terminal may also be controlled with respect to each piece of positional information thereof (for each area in which the POC communication terminal presently exists).

The presence server 400 attains by the device status detector the group information controlled by the CUG server 200 to detect the latest device statuses of the POC communication terminals contained in the group information and then stores and controls the device statuses in the device status storage thereof. The method of acquiring the group information controlled by the CUG server 200 and the method of detecting the device statuses of the POC communication terminals in the group information are not particularly restricted only if the control table can be constructed as shown in FIG. 7. For example, the presence server 400 may obtain the group information controlled by the CUG server 200 as below. The CUG server 200 periodically or at a desired point of time transmits the group information to the presence server 400. Or, the presence server 400 sends an acquisition request of the group information to the CUG server 200. The presence server 400 may detect the device statuses as follows. The server 400 accesses the POC communication terminal to detect the device status thereof. Alternatively, when the POC communication terminal executes update processing of the registration of positions via the radio station with the call control server 100, the presence server 400 may also detect the device statuses of the POC communication terminals from the call control server 100.

As above, the presence server 400 controls the device statuses such as positional information and call states of the POC communication terminals of the POC communication terminals included in the group information under supervision of the CUG server 200. Therefore, in the operation to set up radio communication between POC communication terminals in the group information controlled by the CUG server 200, the POC communication terminal can determine the latest device statuses of the POC communication terminals in the group information. Consequently, whether a particular POC communication terminal is in the online state or in the offline state can be determined and the position of each POC communication terminal can also be recognized. The CUG server 200 attains the device statuses of the POC communication terminals supervised by the presence server 400 by accessing the presence server 400. The device statuses are fed via the POC server 300 and the call control server 100 to the POC communication terminal having issued the request for the setup of radio communication. The terminal then presents the device statuses on its display. The user can hence recognize the device statuses of the POC communication terminals. Referring next to the system configuration of the radio communication system shown in FIG. 4, description will be given of an example of processing between the constituent components when the POC communication terminal obtains the device statuses of the POC communication terminals in the group information.

The POC communication terminal sends via the radio base station a setup request to the control station side to set up radio communication between the POC communication terminals in the group information to which the terminal identification information of the POC communication terminal is registered. The call control server 100 on the control station side receives the setup request from the POC communication terminal and then transmits the setup request to the POC server 300. The server 300 receives the request from the server 100. According to the setup request, the POC server 300 accesses the CUG server 200 to transmit an authentication request of the POC communication terminal to the CUG server 200. The server 200 executes authentication processing for the POC communication terminal according to the group information controlled by the CUG server 200. If the group information includes terminal identification information of the POC communication terminal having issued the setup request, the CUG server 200 accesses the presence server 400 to obtain the device statuses of the POC communication terminals in the group information to which the terminal identification information of the POC communication terminal having issued the setup request is registered. The CUG server 200 transmits to the POC server 300 the group information and the device statuses of the POC communication terminals in the group information. The server 300 receives the group information and the device statuses to send these information items via the call control server 100 to the POC communication terminal having issued the setup request. As a result, the POC communication terminal can acquire the device statues of the POC communication terminals in the group information. In the processing, if the group information under supervision of the CUG server 200 includes the terminal identification information of the POC communication terminal as the setup request source, the CUG server 200 accesses the presence server 400 to obtain the device statuses. However, the CUG server 200 may periodically access the presence server 400 to obtain the device statuses. Although the CUG server 200 delivers the group information and the device statuses to the POC server 300 in the processing described above, the CUG server 200 may also create group information including the device statuses to send the group information to the POC server 300. In a case in which the CUG server 200 periodically accesses the presence server 400 to obtain the device statuses, it is also possible to create group information including the device statuses to control the group information.

Method of Creating Group Information (of CUG Group) Controlled by CUG Server 200

Referring now to FIG. 8, description will be given of a method of generating group information (of a CUG group) required to conduct radio communication between POC communication terminals in a particular group using the radio communication system shown in FIG. 4.

First, the user as a host to carry out wireless communication between POC communication terminals accesses the CUG server 200 from a POC host communication terminal thereof to register group application information to the CUG server 200 to set up radio communication between particular POC communication terminals (step S1). The group application information includes necessary information such as group identification information to identify a group table to be additionally created by the CUG server 200, terminal identification information of a POC host communication terminal registered to the group table, and expiration date information to set a valid period for the setup of wireless communication.

According to the group application information, the CUG server 200 produces a group table including only the terminal identification information, i.e., POC host terminal identification information of a POC host communication terminal. The server 200 additionally sets group identification information and expiration date information to the group table to obtain group information as shown in FIG. 9 and then stores the group information in a storage thereof (step S2).

In the description of the processing by the CUG server 200 to generate group information, the POC host communication terminal registers the group identification information to the CUG server 200. However, it is also possible that when the group application request is received from the POC host communication terminal, the CUG server 200 creates particular group identification information to add the group identification information to the group table.

When the CUG server 200 stores the group information in the storage thereof as described above, the CUG server 200 creates a password required to update the group information. The CUG server 200 transmits the password and the group identification information contained in the group information to the POC host communication terminal (step S3).

The POC host communication terminal receives the group identification information and the password. The user as the host possessing the POC host communication terminal notifies the group identification information and the password to participants associated with the setup of radio communication between the particular POC communication terminals.

The method of notifying the group identification information and the password is not particularly restricted. For example, it is possible to notify these items from the POC host communication terminal to the POC communication terminals by e-mail or by short mail. Alternatively, the information items may be notified using voices and/or a memo.

Next, a first participant having received the group identification information and the password accesses the CUG server 200 from a first POC communication terminal thereof to send the group identification information and the password to the CUG server 200 (step S4).

After having received the group identification information and the password, the CUG server 200 retrieves group information including group identification information matching that received from the first POC communication terminal. The server 200 registers the terminal identification information of the first POC communication terminal to the group information thus retrieved to automatically update the group information as shown in FIG. 10 (step S5). As a result of the operation, when the operator depresses the press-to-talk switch of the first POC communication terminal registered to the group information (see FIG. 10) controlled by the CUG server 200, it is possible for the terminal to set up radio communication with the POC host communication terminal which is another POC communication terminal in the group information to which the first POC communication terminal is registered.

The registration of the terminal identification information of the first POC communication terminal to the group information is accomplished when the password received by the CUG server 200 from the first POC communication terminal matches the password to allow registration of the terminal identification information to the group information.

Like the first participant, an N-th participant (N is an integer) having received the group identification information and the password accesses the CUG server 200 by an N-th POC communication terminal thereof to send the group identification information and the password to the CUG server 200 (step S6).

When the group identification information and the password are received, the CUG server 200 retrieves group information including group identification information equal to that received from the N-th POC communication terminal. The server 200 registers the terminal identification information of the N-th POC communication terminal to the group information thus retrieved to automatically update the group information under control of the CUG server 200 as shown in FIG. 6 (step S7). As a result, when the user depresses the press-to-talk switch of the N-th POC communication terminal registered to the group information controlled by the CUG server 200, the terminal can establish radio communication with the POC communication terminals including the POC host communication terminal and the first POC communication terminal registered to the group information (see FIG. 6) to which the terminal identification information of the N-th POC communication terminal is registered.

As above, a participant having received the group identification information and the password accesses the CUG server 200 by use of a POC communication terminal thereof to send the group identification information and the password to the CUG server 200 (step S6). Resultantly, the terminal identification information of the POC communication terminal of the participant can be automatically registered to the group information controlled by the CUG server 200. It is therefore possible to automatically update a member list or terminal identification of POC communication terminals in the group information under supervision of the CUG server 200. This advantageously makes it possible to set up radio communication in a short period of time between the POC communication terminals registered to the group information supervised by the CUG server 200.

In the description of step S1 of the processing, the POC host communication terminal accesses the CUG server 200 to send the group application information to the server 200 such that the server 200 creates a group table to obtain group information to which the terminal identification information of the POC host communication terminal is registered. However, it is also possible that the operator accesses the CUG server 200 using an information processor such as a PC to deliver the group application information to the server 200. Thereafter, the server 200 produces a group table to attain group information to which the terminal identification information of the POC host communication terminal is registered.

Although the CUG server 200 transmits the group application information and the password to the POC host communication terminal in step S3, the method for the CUG server 200 to generate the password and conditions used in the operation do not restrict the present invention. It is only necessary to create a password required to update the group information controlled by the CUG server 200. For example, a password may be fed from the POC communication terminal side to the CUG server side. Or, a desired password may be generated on the side of the CUG server 200. In the password control operation, passwords required to update the group information may be classified with respect to each piece of group information. For example, as shown in FIG. 11, a password may be added to each piece of group information to be controlled by the CUG server 200.

In the first embodiment of the wireless communication system, when the CUG server 200 receives from a POC host communication terminal a group application request to establish radio communication between predetermined POC communication terminals, the server 200 creates a group table to set up wireless communication between the predetermined POC communication terminals and produces group information by adding group identification information for identifying the group table to the group table. The server 200 stores the group information in a storage thereof. The server 200 sends the group identification information added to the group table to the POC host communication terminal as the source of the group application request. When a registration request to the group table generated by the CUG server 200 and group identification information to identify the group table associated with the registration request are received from a POC communication terminal, the CUG server 200 retrieves from its storage a group table including the group identification information received from the POC communication terminal and then automatically registers terminal identification information of the POC communication terminal to the group table. This makes it possible to set up wireless communication in a short period of time between the POC communication terminals registered to the group table under supervision of the CUG server 200. In consequence, in the radio communication system of the first embodiment, a POC communication terminal can easily participate in the group information to establish radio communication between particular POC communication terminals. This also mitigates restrictions imposed on the utilization modes in the radio communication using a press-to-talk switch. It is therefore possible to construct a communication system in which a new participant conducts wireless communication using his or her POC communication terminal in a short period of time.

Second Embodiment

Next, description will be given of a second embodiment.

In the method of creating group information in the first embodiment of the radio communication system, a participant having received group identification information and a password accesses the CUG server 200 using his or her POC communication terminal. By registering the group identification information and the password from the POC communication terminal to the CUG server 200, terminal identification information of the POC communication terminal can be automatically registered to the group information controlled by the server 200. It can therefore also be considered that the terminal identification information of the POC communication terminal of the participant having received group identification information and the password as above is beforehand registered to the group information supervised by the server 200. In accordance with one aspect of the second embodiment, there is configured a radio communication system capable of deleting terminal identification information of a POC communication terminal registered to the group information under supervision of the CUG server 200. Referring next to FIG. 12, description will be given of a method of removing terminal identification information of a POC communication terminal included in the group information.

First, the user as a host to conduct wireless communication between POC communication terminals obtains via the call control server 100, by use of his or her POC host communication terminal, group information including terminal identification information of a POC host communication terminal supervised by the CUG server 200 on the control station side. Assume that when an attempt is made to set up radio communication between POC communication terminals included in the group information obtained by the POC host communication terminal, the user recognizes on the display of the POC communication terminal that the group information includes terminal identification information of a POC communication terminal not familiar with the user as the host. In this situation, the user operates an operator's section of the POC communication terminal to specify the terminal identification information of the unknown POC communication terminal included in the group information to establish call control with the control station side. Resultantly, the POC communication terminal of the user sets up radio communication with the unknown POC communication terminal. The user communicates audio information with a participant possessing the unknown POC communication terminal, and it is recognized that the terminal identification information of the unknown POC communication terminal has been registered to the group information controlled by the CUG server 200 through an illegal access. The user as the host accordingly deletes the terminal identification information of the unknown POC communication terminal from the group information.

The operation to remove the terminal identification information of the unknown POC communication terminal from the group information is carried out as below. The POC host communication terminal is used to access the CUG server 200 to send thereto a deletion request of the terminal identification information of the unknown POC communication terminal from the group information supervised by the CUG server 200 (step S10) as shown in FIG. 12. Having received the deletion request, the server 200 retrieves group information including terminal identification information of the POC host communication terminal to delete terminal identification information of the POC host communication terminal from the group information (step S11). Therefore, even if the group information supervised by the CUG server 200 includes an unknown POC communication terminal, it is possible to automatically delete the unknown POC communication terminal from the group information by the deletion request from the POC host communication terminal.

The deletion of the unknown POC communication terminal from the group information controlled by the CUG server 200 is conducted as follows. In step S10, the POC host communication terminal transmits a deletion request, the terminal identification information of the POC host communication terminal, and the terminal identification information of the POC host communication terminal as an object of deletion to the CUG server 200. In step S11, the server 200 retrieves, according to the terminal identification information of the POC host communication terminal, group information including the terminal identification information and then deletes from the group information the terminal identification information of the POC host communication terminal.

It is also possible in step S10 that the POC host communication terminal sends group identification information together with the deletion request to the CUG server 200. In step 11, according to the group identification information, the server 200 retrieves group information matching the group identification information to remove the terminal identification information from the group information. It is also possible that in step S10 that the POC host communication terminal delivers the password obtained from the CUG server 200 to the CUG server 200. In step S11, when the server determines that the password received from the POC host communication terminal matches that generated when the group information is created, the CUG server 200 deletes the terminal identification information as an object of deletion. In the configuration of the embodiment associated with FIG. 12, to guarantee security of the group information supervised by the CUG server 200, only when the server 200 receives the deletion request from the POC host communication terminal, the server 200 deletes from the group information the terminal identification information of the POC host communication terminal to be deleted. However, the system may also be constructed as below. When a deletion request is received from a POC communication terminal included in the group information under supervision of the CUG server 200, the server 200 deletes terminal information of the pertinent POC communication terminal from the group information. In the operation of the CUG server 200 to delete the terminal information of the pertinent POC communication terminal from the group information in response to the deletion request from the POC communication terminal, the system is favorably constructed such that only the terminal information of the POC communication terminal having issued the deletion request to the CUG server 200 is deleted.

In the radio communication system of the second embodiment, when a registration request to group information under control of the CUG server 200 and group identification information to identify the group information as the destination of registration are received from a POC communication terminal, the terminal information of the POC communication terminal having sent the registration request is automatically registered to the group information controlled by the CUG server 200. Moreover, when a deletion request to delete terminal identification information of a POC communication terminal included in group information supervised by the CUG server 200 and the terminal identification information as an object of deletion are received from a POC communication terminal, the CUG server 200 automatically deletes the terminal identification information of the POC communication terminal from the group information under control of the server 200. It is therefore possible to mitigate the restrictions imposed on the utilization modes in radio communication using a press-to-talk switch.

The above embodiment has been described only as a favorable embodiment in accordance with the present invention and hence can be changed and modified within the scope and spirit of the present invention. For example, in the embodiment of the radio communication system including POC communication terminals 1 to N on the mobile station side and a call control server 100, a CUG server 200, a POC server 300, and a presence server 400 on the control station side, if radio communication between POC communication terminals contained in the group information supervised by the CUG server 200 is set up via the POC sever 300 by the call control server 100 and information such as information of voices and sounds transmitted from the POC communication terminal to the call control server 100 can be sent between the POC communication terminals in the group information set up by the call control server 100, the communication of information from the control station side including the call control server 100, the CUG server 200, the POC server 300, and the presence server 400 is not particularly limited and the configuration on the control station side is not particularly restricted.

The group information communicated between radio communication systems in the embodiment may be communicated as an address expressed by, for example, a URI associated with a telephone number. The address format of the group information is not particularly limited and hence, for example, MSISDN and session interface protocol (SIP) URI are also available. The radio communication system in accordance with the present invention may be configured by executing a program by an information processor capable of setting up radio communication between POC communication terminals, the program achieving the processing of the embodiment described above.

In the radio communication system in accordance with the present invention, the configuration may include a plurality of CUG servers 200-1 to 200-N. In this case, the control operation is conducted using the group information and CUG server identification information to identify the CUG servers 200-1 to 200-N. In operation, information including the group identification information and the CUG server identification information is communicated between the respective devices.

The POC communication terminal in accordance with the present invention may further include a camera and a shutter button thereof to transmit audio information and video information. In this configuration, in a state in which the press-to-talk switch is depressed and audio information is sent to a second POC communication terminal registered to group information, when the shutter button is depressed, the camera shoots an external image to produce video image. The image is sent as video information together with audio information to the second POC communication terminal registered to the group information. In the transmission of the audio information and the video information as above, the signal transmission is carried out within a range of transmission capacity assigned to a communication line of the radio communication system POC communication terminal registered to group information.

In the POC communication terminal in accordance with the present invention, when radio communication is established between POC communication terminals included in the group information and audio information and video information are transmitted, it is possible to recognize the call status such as an online status or an offline status of each of the POC communication terminals in the group information. Consequently, it is also possible to configure POC communication terminals as follows. Specifically, audio information and/or video information are/is sent only to the POC communication terminals in the online state. For the POC communication terminals in the offline state, a table of the POC communication terminals in the offline state is automatically created so that a piece of e-mail or short mail is sent in a broadcasting mode to the POC communication terminals at a time in the offline state.

The control station, the radio communication system, and the radio communication method are applicable to a radio communication system using an information communication terminal in which radio communication can be conducted between particular communication terminals by depressing a predetermined operation button of the information communication terminal.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A control station for setting up radio communication between a plurality of mobile stations conducting radio communication using a press-to-talk switch, the control station comprising:
   a group information storage device for, when a group application request to establish radio communication between particular mobile stations is received from a communication device,
      creating a group table to set up radio communication between the particular mobile stations,
      generating group information by adding group identification information identifying the group table to the group table thus created, and
      storing the group information therein;
   a group identification information transmitter for transmitting the group identification information assigned to the group table to the communication device that is a source of the group application request;
   a registering section for, when a registration request to the group table and the group identification information are received from at least one particular mobile station,
      retrieving from the stored group information a group table assigned a group identification information matching the group identification information received from the at least one particular mobile station, and
      registering information of the at least one particular mobile station that is a source of the registration request to a group table assigned the group identification information received from the at least one particular mobile station;
   a section for transmitting grant information indicating to the communication device that the registration request to the group table is granted, wherein the registering section registers the the registration request to the group table is granted, wherein the registering section registers the information of the at least one particular mobile station to the group table when the grant information is received; and
   a radio communication establishing section for setting up radio communication between mobile stations registered in the group table.

2. A control station in accordance with claim 1, wherein the grant information is created when the group table is generated, the group information is created by assigning the grant information to the group table, and the registering section registers information of the at least one particular mobile station that is the source of the registration request to the group table only when the received grant information matches the grant information assigned to the group table.

3. A control station in accordance with claim 2, further comprising a deleting section for, when a deletion request of a mobile station from the group table is received from the communication device, deleting information of the mobile station as an object of deletion is deleted from the group table.

4. A control station in accordance with claim 3, wherein the communication device is a mobile station controlling the group table; and the deleting section, only when a deletion request of a mobile station from a group table to which information of the mobile station is registered is received from the mobile station controlling the group table, retrieves the group table to which information of the mobile station is registered and deletes information of the mobile station that is an object of deletion from the group table.

5. A control station in accordance with claim 1, further comprising a section for registering information of a mobile station controlling the group table to the group table created when the group application request is received from the communication device.

6. A control station in accordance with claim 5, wherein the particular communication device is a mobile station, and information of the mobile station controlling the group table is registered to the group table created when the group application request is received from the at least one particular mobile station.

7. A control station in accordance with claim 6, further comprising a deleting section for, when a deletion request of a mobile station from the group table is received from the communication device, deleting information of the mobile station as an object of deletion is deleted from the group table.

8. A control station in accordance with claim 7, wherein the communication device is a mobile station controlling the group table; and the deleting section, only when a deletion request of a mobile station from a group table to which information of the mobile station is registered is received from the mobile station controlling the group table, retrieves the group table to which information of the mobile station is registered and deletes information of the mobile station that is an object of deletion from the group table.

9. A control station in accordance with claim 5, further comprising a deleting section for when a deletion request of a mobile station from the group table is received from the communication device, deleting information of the mobile station as an object of deletion is deleted from the group table.

10. A control station in accordance with claim 9, wherein the communication device is a mobile station controlling the group table; and the deleting section, only when a deletion request of a mobile station from a group table to which information of the mobile station is registered is received from the mobile station controlling the group table, retrieves the group table to which information of the mobile station is registered and deletes information of the mobile station that is an object of deletion from the group table.

11. A control station in accordance with claim 1, wherein the communication device is a mobile station, and information of a mobile station controlling the group table is registered to the group table created when the group application request is received from the at least one particular mobile station.

12. A control station in accordance with claim 11, further comprising a deleting section for, when a deletion request of a mobile station from the group table is received from the communication device, deleting information of the mobile station as an object of deletion is deleted from the group table.

13. A control station in accordance with claim 12, wherein the communication device is a mobile station controlling the group table; and the deleting section, only when a deletion request of a mobile station from a group table to which information of the mobile station is registered is received from the mobile station controlling the group table, retrieves the group table to which information of the mobile station is registered and deletes information of the mobile station that is an object of deletion from the group table.

14. A control station in accordance with claim 1, further comprising a deleting section for, when a deletion request of a mobile station from the group table is received from the communication device, deleting information of the mobile station as an object of deletion is deleted from the group table.

15. A control station in accordance with claim 14, wherein the communication device is a mobile station controlling the group table; and the deleting section, only when a deletion request of a mobile station from a group table to which information of the mobile station is registered is received from the mobile station controlling the group table, retrieves the group to which information of the mobile station is registered and deletes information of the mobile station that is an object of deletion from the group table.

16. A control station in accordance with claim 1, wherein the radio communication establishing section, when a setup request of radio communication between mobile stations registered to the group table is received from the at least one particular mobile station, retrieves a group table including information of a mobile station that is a source of the setup request from the group information and establishes radio communication between mobile stations registered to the group table.

17. A radio communication system, comprising: a plurality of mobile stations conducting radio communication using a press-to-talk switch; a communication device; and a control station for establishing radio communication between a plurality of mobile stations, wherein the control station comprises:
   a group information storage device for, when a group application request to establish radio communication between particular mobile stations is received from the communication device,
      creating a group table to set up radio communication between the particular mobile stations,
      generating group information by adding group identification information identifying the group table to the group table, and
      storing the group information therein;
   a group identification information transmitter for transmitting the group identification information assigned to the group table to the communication device that is a source of the group application request;
   a registering section for, when a registration request to the group table, the group identification information, and information of the mobile station are received from at least one particular mobile station,
      registering the information of the at least one particular mobile station to a group table assigned with the group identification information received from the at least one particular mobile station;
   a section for transmitting grant information indicating to the communication device that the registration request to the group table is granted, wherein the registering section registers the information of the at least one particular mobile station to the group table when the grant information is received; and
   a radio communication establishing section for, when a setup request of radio communication between mobile stations registered to the group table is received from the at least one particular mobile station, setting up radio communication between the mobile stations registered to the group table;
the communication device comprises:
   a transmitter for sending to the control station the group application request to establish radio communication between the mobile stations; and
   a receiver for receiving the group identification information from the control station; and
each of the plurality of mobile stations comprises:
   a group registration request section for sending to the control station a registration request to register information thereof to the group table, group identification information to identify the group table, and information of the mobile station; and
   a radio communication setup request section for sending the control station a setup request to establish radio communication between mobile stations registered to the group table to which the information of the mobile station is registered.

18. A radio communication system in accordance with claim 17, wherein, when the registration request to the group table, the group identification information, and the information of the mobile station are received from the mobile station side, the control station retrieves a group table assigned with group identification information matching that received from the at least one particular mobile station from the group information stored in the control station and then registers the information of the at least one particular mobile station to the group table.

19. A radio communication system in accordance with claim 18, wherein the communication device is a mobile station and the control station registers information of a mobile station controlling the group table to the group table created when the group application request is received.

20. A radio communication system in accordance with claim 19, wherein the communication device comprises a section for transmitting a deletion request of a mobile station from the group table to the control station and the control station comprises a deleting section for, when the deletion request of a mobile station from the group table is received, deleting information of the mobile station associated with the deletion request from the group table.

21. A radio communication system in accordance with claim 20, wherein the communication device is a mobile station controlling the group table; and
   only when the deletion request of a mobile station from a group table to which information of the mobile station is registered is received from the mobile station controlling the group table, the control station retrieving the group table to which information of the mobile station is registered and deleting information of the mobile station that is object of deletion from the group table.

22. A radio communication system in accordance with claim 18, wherein the communication device comprises a section for transmitting a deletion request of a mobile station from the group table to the control station and the control station comprises a deleting section for, when the deletion request of a mobile station from the group table is received, deleting information of the mobile station associated with the deletion request from the group table.

23. A radio communication system in accordance with claim 22, wherein the communication device is a mobile station controlling the group table; and only when the deletion request of a mobile station from a group table to which information of the mobile station is registered is received from the mobile station controlling the group table, the control station retrieving the group table to which information of the mobile station is registered and deleting information of the mobile station that is an object of deletion from the group table.

24. A radio communication system in accordance with claim 18, wherein the communication device further comprises a section for receiving the grant information from the control station; and the mobile station further comprises a section for sending to the control station a registration request to register information thereof to the group table, group identification information to identify the group table, information of the mobile station, and the grant information.

25. A radio communication system in accordance with claim 24, wherein the communication device is a mobile station and the control station registers information of a mobile station controlling the group table to the group table created when the group application request is received.

26. A radio communication system in accordance with claim 25, wherein the communication device comprises a section for transmitting a deletion request of a mobile station from the group table to the control station and the control station comprises a deleting section for, when the deletion request of a mobile station from the group table is received, deleting information of the mobile station associated with the deletion request from the group table.

27. A radio communication system in accordance with claim 26, wherein the communication device is a mobile station controlling the group table; and only when the deletion request of a mobile station from a group table to which information of the mobile station is registered is received from the mobile station controlling the group table, the control station retrieving the group table to which information of the mobile station is registered and deleting information of the mobile station that is an object of deletion from the group table.

28. A radio communication system in accordance with claim 24, wherein the communication device comprises a section for transmitting a deletion request of a mobile station from the group table to the control station and the control station comprises a deleting section for, when the deletion request of a mobile station from the group table is received, deleting information of the mobile station associated with the deletion request from the group table.

29. A radio communication system in accordance with claim 28, wherein the communication device is a mobile station controlling the group table; and only when the deletion request of a mobile station from a group table to which information of the mobile station is registered is received from the mobile station controlling the group table, the control station retrieving the group table to which information of the mobile station is registered and deleting information of the mobile station that is an object of deletion from the group table.

30. A radio communication system in accordance with claim 24, wherein the control station creates the grant information when it generates the group table, produces the group information by assigning the grant information to the group table, and registers the information of the mobile station to the group table only when the grant information received by the control station matches the grant information assigned to the group table.

31. A radio communication system in accordance with claim 30, wherein the communication device comprises a section for transmitting a deletion request of a mobile station from the group table to the control station and the control station comprises a deleting section for, when the deletion request of a mobile station from the group table is received, deleting information of the mobile station associated with the deletion request from the group table.

32. A radio communication system in accordance with claim 31, wherein the communication device is a mobile station controlling the group table; and only when the deletion request of a mobile station from a group table to which information of the mobile station is registered is received from the mobile station controlling the group table, the control station retrieving the group table to which information of the mobile station is registered and deleting information of the mobile station that is an object of deletion from the group table.

33. A radio communication system in accordance with claim 30, wherein the communication device is a mobile station and the control station registers information of a mobile station controlling the group table to the group table created when the group application request is received.

34. A radio communication system in accordance with claim 33, wherein the communication device comprises a section for transmitting a deletion request of a mobile station from the group table to the control station and the control station comprises a deleting section for, when the deletion request of a mobile station from the group table is received, deleting information of the mobile station associated with the deletion request from the group table.

35. A radio communication system in accordance with claim 34, wherein the communication device is a mobile station controlling the group table; and only when the deletion request of a mobile station from a group table to which information of the mobile station is registered is received from the mobile station controlling the group table, the control station retrieving the group table to which information of the mobile station is registered and deleting information of the mobile station that is an object of deletion from the group table.

36. A radio communication system in accordance with claim 17, wherein the communication device further comprises a section for receiving the grant information from the control station; and the mobile station further comprises a section for sending to the control station a registration request to register information thereof to the group table, group identification information to identify the group table, information of the mobile station, and the grant information.

37. A radio communication system in accordance with claim 36, wherein the control station creates the grant information when it generates the group table, produces the group information by assigning the grant information to the group table, and registers the information of the mobile station to the group table only when the grant information received by the control station matches the grant information assigned to the group table.

38. A radio communication system in accordance with claim 37, wherein the communication device is a mobile station and the control station registers information of a mobile station controlling the group table to the group table created when the group application request is received.

39. A radio communication system in accordance with claim 38, wherein the communication device comprises a section for transmitting a deletion request of a mobile station from the group table to the control station and the control station comprises a deleting section for, when the deletion request of a mobile station from the group table is received, deleting information of the mobile station associated with the deletion request from the group table.

40. A radio communication system in accordance with claim 39, wherein the communication device is a mobile station controlling the group table; and
   only when the deletion request of a mobile station from a group table to which information of the mobile station is registered is received from the mobile station controlling the group table, the control station retrieving the group table to which information of the mobile station is registered and deleting information of the mobile station that is an object of deletion from the group table.

41. A radio communication system in accordance with claim 37, wherein the communication device comprises a section for transmitting a deletion request of a mobile station from the group table to the control station and the control station comprises a deleting section for, when the deletion request of a mobile station from the group table is received, deleting information of the mobile station associated with the deletion request from the group table.

42. A radio communication system in accordance with claim 41, wherein the communication device is a mobile station controlling the group table; and
   only when the deletion request of a mobile station from a group table to which information of the mobile station is registered is received from the mobile station controlling the group table, the control station retrieving the group table to which information of the mobile station is registered and deleting information of the mobile station that is an object of deletion from the group table.

43. A radio communication system in accordance with claim 36, wherein the communication device is a mobile station and the control station registers information of a mobile station controlling the group table to the group table created when the group application request is received.

44. A radio communication system in accordance with claim 43, wherein the communication device comprises a section for transmitting a deletion request of a mobile station from the group table to the control station and the control station comprises a deleting section for, when the deletion request of a mobile station from the group table is received, deleting information of the mobile station associated with the deletion request from the group table.

45. A radio communication system in accordance with claim 44, wherein communication device is a mobile station controlling the group table; and
   only when the deletion request of a mobile station from a group table to which information of the mobile station is registered is received from the mobile station controlling the group table, the control station retrieving the group table to which information of the mobile station is registered and deleting information of the mobile station that is an object of deletion from the group table.

46. A radio communication system in accordance with claim 36, wherein the communication device comprises a section for transmitting a deletion request of a mobile station from the group table to the control station and the control station comprises a deleting section for, when the deletion request of a mobile station from the group table is received, deleting information of the mobile station associated with the deletion request from the group table.

47. A radio communication system in accordance with claim 46, wherein the communication device is a mobile station controlling the group table; and
   only when the deletion request of a mobile station from a group table to which information of the mobile station is registered is received from the mobile station controlling the group table, the control station retrieving the group table to which information of the mobile station is registered and deleting information of the mobile station that is an object of deletion from the group table.

48. A radio communication system in accordance with claim 17, wherein the control station comprises a section for registering information of a mobile station controlling the group table to the group table created when the group application request is received from the communication device.

49. A radio communication system in accordance with claim 48, wherein the communication device is a mobile station and the control station registers information of the mobile station controlling the group table to the group table created when the group application request is received.

50. A radio communication system in accordance with claim 49, wherein the communication device comprises a section for transmitting a deletion request of a mobile station from the group table to the control station and the control station comprises a deleting section for, when the deletion request of a mobile station from the group table is received, deleting information of the mobile station associated with the deletion request from the group table.

51. A radio communication system in accordance with claim 50, wherein the communication device is a mobile station controlling the group table; and
   only when the deletion request of a mobile station from a group table to which information of the mobile station is registered is received from the mobile station controlling the group table, the control station retrieving the group table to which information of the mobile station is registered and deleting information of the mobile station that is an object of deletion from the group table.

52. A radio communication system in accordance with claim 48, wherein the communication device comprises a section for transmitting a deletion request of a mobile station from the group table to the control station and the control station comprises a deleting section for, when the deletion request of a mobile station from the group table is received, deleting information of the mobile station associated with the deletion request from the group table.

53. A radio communication system in accordance with claim 52, wherein the communication device is a mobile station controlling the group table; and
   only when the deletion request of a mobile station from a group table to which information of the mobile station is registered is received from the mobile station controlling the group table, the control station retrieving the group table to which information of the mobile station is registered and deleting information of the mobile station that is an object of deletion from the group table.

54. A radio communication system in accordance with claim 17, wherein the communication device is a mobile station and the control station registers information of a mobile station controlling the group table to the group table created when the group application request is received.

55. A radio communication system in accordance with claim 54, wherein the communication device comprises a section for transmitting a deletion request of a mobile station from the group table to the control station and the control station comprises a deleting section for, when the deletion request of a mobile station from the group table is received, deleting information of the mobile station associated with the deletion request from the group table.

56. A radio communication system in accordance with claim 55, wherein the communication device is a mobile station controlling the group table; and
only when the deletion request of a mobile station from a group table to which information of the mobile station is registered is received from the mobile station controlling the group table, the control station retrieving the group table to which information of the mobile station is registered and deleting information of the mobile station that is an object of deletion from the group table.

57. A radio communication system in accordance with claim 17, wherein the communication device comprises a section for transmitting a deletion request of a mobile station from the group table to the control station and the control station comprises a deleting section for, when the deletion request of a mobile station from the group table is received, deleting information of the mobile station associated with the deletion request from the group table.

58. A radio communication system in accordance with claim 57, wherein the communication device is a mobile station controlling the group table; and
only when the deletion request of a mobile station from a group table to which information of the mobile station is registered is received from the mobile station controlling the group table, the control station retrieving the group table to which information of the mobile station is registered and deleting information of the mobile station that is an object of deletion from the group table.

59. A radio communication system in accordance with claim 17, wherein when the setup request of radio communication between mobile stations registered to the group table is received from the at least on particular mobile station, the control station retrieves a group table including information of the at least one particular mobile station that is a source of the setup request from the group information and establishes radio communication between mobile stations registered to the group table.

60. A radio communication method applied to a system including a plurality of mobile stations conducting radio communication therebetween using a press-to-talk switch, a communication device, and a control station for establishing radio communication between the plurality of mobile stations, the method comprising the steps of:
the communication device transmitting a group application request to the control station to establish radio communication between particular mobile stations;
when the group application request is received from the communication device, the control station
creating a group table to set up radio communication between the particular mobile stations,
generating group information by adding group identification information identifying the group table to the group table thus created, and
storing the group information in a storage thereof;
the control station transmitting the group identification information assigned to the group table to the communication device that is a source of the group application request;
the communication device receiving the group identification information from the control station;
the at least one particular mobile station transmitting a registration request to register information thereof to the group table, group identification information to identify the group table, and information of the mobile station to the control station;
when the registration request to the group table, the group identification information, and the information of the mobile station are received from the at least one particular mobile station, the control station registering the information of the at least one particular mobile station to the group table assigned with the group identification information received from the at least one particular mobile station;
the control station transmitting grant information indicating to the communication device that the registration request to the group table is granted, wherein the step of the control station registering the information of the at least one particular mobile station to the group table is performed when the grant information is received;
the at least one particular mobile station transmitting a setup request to the control station to set up radio communication between the particular mobile stations registered to the group table to which the information of the at least one particular mobile station is registered; and
when the setup request of radio communication between the particular mobile stations is received from the at least one particular mobile station side, the control station establishing radio communication between the particular mobile stations registered to the group table.

61. A radio communication method in accordance with claim 60, wherein when the registration request to the group table, the group identification information, and the information of the at least one particular mobile station are received from the at least one particular mobile station side, the control station retrieves a group table assigned with group identification information matching that received from the at least one particular mobile station side from the group information stored in the control station and then registers the information of the at least one particular mobile station to the group table.

62. A radio communication method in accordance with claim 61, further comprising the steps of:
the communication device receiving the grant information from the control station; and
the at least one particular mobile station transmitting a registration request to register information thereof to the group table, group identification information to identify the group table, information of the at least one particular mobile station, and the grant information to the control station.

63. A radio communication method in accordance with claim 62, further comprising the steps of:
the control station creating the grant information when the control station generates the group table and producing the group information by assigning the grant information to the group table; and
the control station registering the information of the at least one particular mobile station to the group table only when the grant information received from the at least one particular mobile station matches the grant information assigned to the group table.

64. A radio communication method in accordance with claim 63, wherein the communication device is a mobile station and
the method further comprising the step of the control station registering information of the mobile station controlling the group table to the group table created when the group application request is received from the mobile station.

65. A radio communication method in accordance with claim 64, further comprising the steps of:
  the communication device transmitting a deletion request of at least one particular mobile station from the group table to the control station; and
  when the deletion request of the at least one particular mobile station from the group table is received, the control station deleting information of the mobile station associated with the deletion request from the group table.

66. A radio communication method in accordance with claim 65, wherein the communication device is a mobile station controlling the group table,
  the method further comprising the step of, only when the deletion request of a mobile station in a group table to which information of the mobile station is registered is received from the mobile station controlling the group table, the control station retrieving the group table to which information of the mobile station is registered and deleting information of the mobile station that is an object of deletion from the group table.

67. A radio communication method in accordance with claim 63, further comprising the steps of:
  the communication device transmitting a deletion request of at least one particular mobile station from the group table to the control station; and
  when the deletion request of the at least one particular mobile station from the group table is received, the control station deleting information of the mobile station associated with the deletion request from the group table.

68. A radio communication method in accordance with claim 67, wherein the communication device is a mobile station controlling the group table,
  the method further comprising the step of, only when the deletion request of a mobile station in a group table to which information of the mobile station is registered is received from the mobile station controlling the group table, the control station retrieving the group table to which information of the mobile station is registered and deleting information of the mobile station that is an object of deletion from the group table.

69. A radio communication method in accordance with claim 62, wherein the communication device is a mobile station and
  the method further comprising the step of the control station registering information of the mobile station controlling the group table to the group table created when the group application request is received from the mobile station.

70. A radio communication method in accordance with claim 69, further comprising the steps of:
  the communication device transmitting a deletion request of at least one particular mobile station from the group table to the control station; and
  when the deletion request of the at least one particular mobile station from the group table is received, the control station deleting information of the mobile station associated with the deletion request from the group table.

71. A radio communication method in accordance with claim 70, wherein the communication device is a mobile station controlling the group table,
  the method further comprising the step of, only when the deletion request of a mobile station in a group table to which information of the mobile station is registered is received from the mobile station controlling the group table, the control station retrieving the group table to which information of the mobile station is registered and deleting the information of the mobile station that is an object of deletion from the group table.

72. A radio communication method in accordance with claim 62, further comprising the steps of:
  the communication device transmitting a deletion request of at least one particular mobile station from the group table to the control station; and
  when the deletion request of the at least one particular mobile station from the group table is received, the control station deleting information of the mobile station associated with the deletion request from the group table.

73. A radio communication method in accordance with claim 72, wherein the communication device is a mobile station controlling the group table,
  the method further comprising the step of, only when the deletion request of a mobile station in a group table to which information of the mobile station is registered is received from the mobile station controlling the group table, the control station retrieving the group table to which information of the mobile station is registered and deleting information of the mobile station that is an object of deletion from the group table.

74. A radio communication method in accordance with claim 61, wherein the communication device is a mobile station and
  the method further comprising the step of the control station registering information of the mobile station controlling the group table to the group table created when the group application request is received from the mobile station.

75. A radio communication method in accordance with claim 74, further comprising the steps of:
  the communication device transmitting a deletion request of at least one particular mobile station from the group table to the control station; and
  when the deletion request of the at least one particular mobile station from the group table is received, the control station deletion information of the mobile station associated with the deletion request from the group table.

76. A radio communication method in accordance with claim 75, wherein the communication device is a mobile station controlling the group table,
  the method further comprising the step of, only when the deletion request of a mobile station in a group table to which information of the mobile station is registered is received from the mobile station controlling the group table, the control station retrieving the group table to which information of the mobile station is registered and deleting information of the mobile station that is an object of deletion from the group table.

77. A radio communication method in accordance with claim 61, further comprising the steps of:
  the communication device transmitting a deletion request of at least one particular mobile station from the group table to the control station; and
  when the deletion request of the at least one particular mobile station from the group table is received, the control station deleting information of the mobile station associated with the deletion request from the group table.

78. A radio communication method in accordance with claim 77, wherein the communication device is a mobile station controlling the group table, the method further comprising the step of, only when the deletion request of a mobile station in a group table to which information of the mobile station is registered is received from the mobile station controlling the group table, the control station retrieving the group table to which information of the mobile station is registered and deleting information of the mobile station that is an object of deletion from the group table.

79. A radio communication method in accordance with claim 60, further comprising the steps of:
communication device receiving the grant information from the control station; and
the at least one particular mobile station transmitting a registration request to register information thereof to the group table, group identification information to identify the group table, information of the at least one particular mobile station, and the grant information to the control station.

80. A radio communication method in accordance with claim 79, further comprising the steps of:
the control station creating the grant information when the control station generates the group table and producing the group information by assigning the grant information to the group table; and
the control station registering the information of the at least one particular mobile station to the group table only when the grant information received from the at least one particular mobile station matches the grant information assigned to the group table.

81. A radio communication method in accordance with claim 80, wherein the communication device is a mobile station and
the method further comprising the step of the control station registering information of the mobile station controlling the group table to the group table created when the group application request is received from the mobile station.

82. A radio communication method in accordance with claim 81, further comprising the steps of:
the communication device transmitting a deletion request of at least one particular mobile station from the group table to the control station; and
when the deletion request of the at least one particular mobile station from the group table is received, the control station deleting information of the mobile station associated with the deletion request from the group table.

83. A radio communication method in accordance with claim 82, wherein the communication device is a mobile station controlling the group table,
the method further comprising the step of, only when the deletion request of a mobile station in a group table to which information of the mobile station is registered is received from the mobile station controlling the group table, the control station retrieving the group table to which information of the mobile station is registered and deleting information of the mobile station that is an object of deletion from the group table.

84. A radio communication method in accordance with claim 80, further comprising the steps of:
the communication device transmitting a deletion request of at least one particular mobile station from the group table to the control station; and
when the deletion request of the at least one particular mobile station from the group table is received, the control station deleting information of the mobile station associated with the deletion request from the group table.

85. A radio communication method in accordance with claim 84, wherein the communication device is a mobile station controlling the group table,
the method further comprising the step of , only when the deletion request of a mobile station in a group table to which information of the mobile station is registered is received from the mobile station controlling the group table, the control station retrieving the group table to which information of the mobile station is registered and deleting information of the mobile station that is an object of deletion from the group table.

86. A radio communication method in accordance with claim 79, wherein the communication device is a mobile station and
the method further comprising the step of the control station registering information of the mobile station controlling the group table to the group table created when the group application request is received from the mobile station.

87. A radio communication method in accordance with claim 86, further comprising the steps of:
the communication device transmitting a deletion request of at least one particular mobile station from the group table to the control station; and
when the deletion request of the at least one particular mobile station from the group table is received, the control station deleting information of the mobile station associate with the deletion request from the group table.

88. A radio communication method in accordance with claim 87, wherein the communication device is a mobile station controlling the group table,
the method further comprising the step of, only when the deletion request of a mobile station in a group table to which information of the mobile station is registered is received from the mobile station controlling the group table, the control station retrieving the group table to which information of the mobile station is registered and deleting information of the mobile station that is an object of deletion from the group table.

89. A radio communication method in accordance with claim 79, further comprising the steps of:
the communication device transmitting a deletion request of at least one particular mobile station from the group table to the control station; and
when the deletion request of the at least one particular mobile station from the group table is received, the control station deleting information of the mobile station associated with the deletion request from the group table.

90. A radio communication method in accordance with claim 89, wherein the communication device is a mobile station controlling the group table,
the method further comprising the step of, only when the deletion request of a mobile station in a group table to which information of the mobile station is registered is received from the mobile station controlling the group table, the control station retrieving the group table to which information of the mobile station is registered and deleting information of the mobile station that is an object of deletion form the group table.

91. A radio communication method in accordance with claim 60, further comprising the step of the control station registering information of at least one particular mobile station controlling the group table to the group table created when the group application request is received from the communication device.

92. A radio communication method in accordance with claim 91, wherein the communication device is a mobile station and the method further comprising the step of the control station registering information of the mobile station controlling the group table to the group table created when the group application request is received from the mobile station.

93. A radio communication method in accordance with claim 92, further comprising the steps of:

the communication device transmitting a deletion request of at least one particular mobile station from the group table to the control station; and when the deletion request of the at least one particular mobile station from the group table is received, the control station deleting information of the mobile station associated with the deletion request from the group table.

94. A radio communication method in accordance with claim 93, wherein the communication device is a mobile station controlling the group table, the method further comprising the step of, only when the deletion request of a mobile station in a group table to which information of the mobile station is registered is received from the mobile station controlling the group table, the control station retrieving the group table to which information of the mobile station is registered and deleting information of the mobile station that is an object of deletion from the group table.

95. A radio communication method in accordance with claim 91, further comprising the steps of:

the communication device transmitting a deletion request of at least one particular mobile station from the group table to the control station; and when the deletion request of the at least one particular mobile station from the group table is received, the control station deleting information of the mobile station associated with the deletion request from the group table.

96. A radio communication method in accordance with claim 95, wherein the communication device is a mobile station controlling the group table, the method further comprising the step of, only when the deletion request of a mobile station in a group table to which information of the mobile station is registered is received from the mobile station controlling the group table, the control station retrieving the group table to which information of the mobile station is registered and deleting information of the mobile station that is an object of deletion from the group table.

97. A radio communication method in accordance with claim 60, wherein the communication device is a mobile station and the method further comprising the step of the control station registering information of the mobile station controlling the group table to the group table created when the group application request is received from the mobile station.

98. A radio communication method in accordance with claim 97, further comprising the steps of:

the communication device transmitting a deletion request of at least one particular mobile station from the group table to the control station; and when the deletion request of the at least one particular mobile station from the group table is received, the control station deleting information of the mobile station associated with the deletion request from the group table.

99. A radio communication method in accordance with claim 98, wherein the communication device is a mobile station controlling the group table, the method further comprising the step of, only when the deletion request of a mobile station in a group table to which information of the mobile station is registered is received from the mobile station controlling the group table, the control station retrieving the group table to which information of the mobile station is registered and deleting information of the mobile station that is an object of deletion from the group table.

100. A radio communication method in accordance with claim 60, further comprising the steps of:

the communication device transmitting a deletion request of at least one particular mobile station from the group table to the control station; and when the deletion request of the at least one particular mobile station from the group table is received, the control station deleting information of the mobile station associated with the deletion request from the group table.

101. A radio communication method in accordance with claim 100, wherein the communication device is a mobile station controlling the group table, the method further comprising the step of, only when the deletion request of a mobile station in a group table to which information of the mobile station is registered is received from the mobile station controlling the group table, the control station retrieving the group table to which information of the mobile station is registered and deleting information of the mobile station that is an object of deletion from the group table.

102. A radio communication method in accordance with claim 60, further comprising the step of, when the setup request of radio communication between mobile stations registered to the group table is received from the mobile station side, the control station retrieving a group table including information of the mobile station that is a source of the setup request from the group information; and establishing radio communication between mobile stations registered to the group table.

\* \* \* \* \*